United States Patent
Abotabl et al.

(10) Patent No.: US 12,184,577 B2
(45) Date of Patent: Dec. 31, 2024

(54) CHANNEL STATE INFORMATION REPORTING AND TIME RESTRICTION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 17/751,357

(22) Filed: May 23, 2022

(65) Prior Publication Data

US 2023/0412338 A1    Dec. 21, 2023

(51) Int. Cl.
*H04W 52/22* (2009.01)
*H04L 5/00* (2006.01)

(52) U.S. Cl.
CPC ......... *H04L 5/0051* (2013.01); *H04W 52/225* (2013.01)

(58) Field of Classification Search
CPC ........ H04L 5/00; H04L 5/0051; H04W 52/22; H04W 52/225
See application file for complete search history.

(56) References Cited

U.S. PATENT DOCUMENTS

| | | | |
|---|---|---|---|
| 9,392,528 B2 * | 7/2016 | Nasielski | H04W 48/02 |
| 9,877,254 B2 * | 1/2018 | Gholmieh | H04W 36/08 |
| 11,589,252 B2 * | 2/2023 | Zhang | H04L 5/0094 |
| 11,665,739 B2 * | 5/2023 | Sun | H04W 74/0816 |
| | | | 370/329 |
| 2006/0178967 A1 * | 8/2006 | Jung | A63F 13/12 |
| | | | 705/35 |
| 2007/0106576 A1 * | 5/2007 | Jung | G06Q 40/04 |
| | | | 705/35 |
| 2007/0136185 A1 * | 6/2007 | Jung | G06Q 40/02 |
| | | | 705/38 |
| 2013/0322302 A1 * | 12/2013 | Gholmieh | H04W 36/08 |
| | | | 370/328 |
| 2015/0188482 A1 * | 7/2015 | Berkowitz | H02S 40/38 |
| | | | 320/101 |
| 2021/0044403 A1 * | 2/2021 | Zhang | H04L 5/0048 |
| 2021/0099265 A1 * | 4/2021 | Shin | H04W 72/0453 |

(Continued)

*Primary Examiner* — Hai V Nguyen
(74) *Attorney, Agent, or Firm* — Holland & Hart LLP

(57) ABSTRACT

Methods, systems, and devices for wireless communications are described. A user equipment (UE) may receive a first message indicating that a configuration for a time restriction is disabled for the UE, such that the UE may measure one or more resources transmitted from a network entity with respect to a reference resource. The UE may receive a second message indicating that the UE is to measure one or more resources transmitted by a network entity at a first of multiple transmit power levels, the one or more resources transmitted before the reference resource, and the reference resource associated with one of the multiple transmit power levels. The UE may perform a first average measurement of the one or more resources and transmit a first report indicating the first average measurement, where the UE performs the average measurement of the one or more resources based on the second message.

30 Claims, 18 Drawing Sheets

(56) References Cited

U.S. PATENT DOCUMENTS

| | | | | |
|---|---|---|---|---|
| 2022/0182865 A1* | 6/2022 | Zhang | .................. | H04B 17/318 |
| 2022/0201528 A1* | 6/2022 | Shin | ...................... | H04L 5/0053 |
| 2023/0344592 A1* | 10/2023 | Zhou | ................ | H04W 52/0235 |
| 2024/0260127 A1* | 8/2024 | Krishnan | ............ | H04W 72/231 |

* cited by examiner

CHANNEL STATE INFORMATION
REPORTING AND TIME RESTRICTION

FIELD OF TECHNOLOGY

The following relates to wireless communications, including channel state information (CSI) reporting and time restriction.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support communications between a UE and a network entity. A UE may measure and report channel measurements for the network entity which the network entity may use to support energy saving operations. In some cases, however, the energy savings may be reduced based on the network entity changing its transmit power.

SUMMARY

The described techniques relate to improved methods, systems, devices, and apparatuses that support channel state information (CSI) reporting and time restriction. For example, the described techniques provide for a user equipment (UE) to report average measurements of resources to a network entity when a time restriction is disabled (e.g., not configured) and when the network entity transmits the resources to the UE at different transmit power levels. The UE may receive a first message indicating that the time restriction parameter is disabled for the UE, and indicating how far back in time the UE is to measure one or more resources the network entity transmitted using a transmit power level in a channel. In addition, the network entity may transmit the one or more resources for measurement by the UE in the channel before a CSI reference resource (e.g., the CSI reference resource may represent an end of a measurement window for the UE). In some examples, the UE may measure and report average measurements of the one or more resources transmitted by the network entity at a first power level, and the UE may reset the average measurement and reporting for one or more additional resources the network entity may transmit at a second power level.

If the channel has relatively small variations in average measurements of resources transmitted at different transmit power levels, the UE may include average measurements of one or more resources transmitted by the network entity at a particular transmit power level based on one or more rules. For example, the UE may include particular average measurements in a report to the network entity based on when the network entity transmitted one or more resources at a particular transmit power level, and how many resources the network entity transmits at each transmit power level, among other rules. For example, if the network entity transmits an equal quantity of resources at two different transmit power levels, the UE may measure the one or more resources associated with the transmit power level that the network entity used most recently before the CSI reference resource. If the channel has significant variations at different transmit power levels, the UE may include average measurements of the most recently transmitted resources at a particular transmit power level regardless of the quantity of resources transmitted at the transmit power level, as an average measurement may more accurately represent current channel conditions.

A method for wireless communication at a UE is described. The method may include receiving a first message indicating a configuration associated with a time restriction is disabled for the UE, where the UE measures one or more resources with respect to a reference resource when the configuration associated with the time restriction is disabled, receiving a second message indicating that the UE is to measure the one or more resources transmitted by a network entity at a first transmit power level of a set of multiple transmit power levels, where the reference resource is associated with one of the set of multiple transmit power levels, and transmitting a first report indicating a first average measurement of the one or more resources associated with the first transmit power level, where the UE measures the one or more resources based on the second message.

An apparatus for wireless communication at a UE is described. The apparatus may include a processor, memory coupled with the processor, and instructions stored in the memory. The instructions may be executable by the processor to cause the apparatus to receive a first message indicating a configuration associated with a time restriction is disabled for the UE, where the UE measures one or more resources with respect to a reference resource when the configuration associated with the time restriction is disabled, receive a second message indicating that the UE is to measure the one or more resources transmitted by a network entity at a first transmit power level of a set of multiple transmit power levels, where the reference resource is associated with one of the set of multiple transmit power levels, and transmit a first report indicating a first average measurement of the one or more resources associated with the first transmit power level, where the UE measures the one or more resources based on the second message.

Another apparatus for wireless communication at a UE is described. The apparatus may include means for receiving a first message indicating a configuration associated with a time restriction is disabled for the UE, where the UE measures one or more resources with respect to a reference resource when the configuration associated with the time restriction is disabled, means for receiving a second message indicating that the UE is to measure the one or more resources transmitted by a network entity at a first transmit power level of a set of multiple transmit power levels, where the reference resource is associated with one of the set of multiple transmit power levels, and means for transmitting a first report indicating a first average measurement of the one or more resources associated with the first transmit power level, where the UE measures the one or more resources based on the second message.

A non-transitory computer-readable medium storing code for wireless communication at a UE is described. The code may include instructions executable by a processor to receive a first message indicating a configuration associated with a time restriction is disabled for the UE, where the UE measures one or more resources with respect to a reference resource when the configuration associated with the time restriction is disabled, receive a second message indicating that the UE is to measure the one or more resources transmitted by a network entity at a first transmit power level of a set of multiple transmit power levels, where the reference resource is associated with one of the set of multiple transmit power levels, and transmit a first report indicating a first average measurement of the one or more resources associated with the first transmit power level, where the UE measures the one or more resources based on the second message.

Some examples of the method, apparatuses, and non-transitory computer-readable medium described herein may further include operations, features, means, or instructions for performing the first average measurement of the one or more resources associated with the first transmit power level, where the one or more resources associated with the first transmit power level occur before the reference resource in time, transmitting the first report indicating the first average measurement of the one or more resources associated with the first transmit power level, performing a second average measurement of the one or more resources associated with a second transmit power level, where the one or more resources associated with the second transmit power level occur before the reference resource in a time domain, and transmitting a second report indicating the second average measurement of the one or more resources associated with the second transmit power level.

Some examples of the method, apparatuses, and non-transitory computer-readable medium described herein may further include operations, features, means, or instructions for performing the first average measurement of the one or more resources associated with the first transmit power level, where a first quantity of the one or more resources associated with the first transmit power level may be larger than a second quantity of the one or more resources associated with a second transmit power level and transmitting the first report indicating the first average measurement of the one or more resources associated with the first transmit power level.

In some examples of the method, apparatuses, and non-transitory computer-readable medium described herein, a third transmit power level that occurs after the second transmit power level in a time domain may be equal to the first transmit power level.

Some examples of the method, apparatuses, and non-transitory computer-readable medium described herein may further include operations, features, means, or instructions for performing the first average measurement of the one or more resources associated with the first transmit power level, applying a power scale to the first average measurement based on performing the first average measurement, where the power scale associates the first average measurement with a second transmit power level, and transmitting the first report indicating the first average measurement of the one or more resources, where the first average measurement may be in terms of the second transmit power level based on applying the power scale.

In some examples of the method, apparatuses, and non-transitory computer-readable medium described herein, a third transmit power level that occurs after the second transmit power level in a time domain may be equal to the second transmit power level.

Some examples of the method, apparatuses, and non-transitory computer-readable medium described herein may further include operations, features, means, or instructions for performing the first average measurement of the one or more resources associated with the first transmit power level and a second average measurement of the one or more resources associated with a second transmit power level, comparing the first average measurement and the second average measurement to identify a correlation between the first average measurement and the second average measurement, and transmitting the first report indicating the first average measurement of the one or more resources associated with the first transmit power level based on the correlation satisfying a threshold, where a first quantity of the one or more resources associated with the first transmit power level may be larger than a second quantity of the one or more resources associated with the second transmit power level.

In some examples of the method, apparatuses, and non-transitory computer-readable medium described herein, transmitting the first report may include operations, features, means, or instructions for transmitting the first report indicating the second average measurement of the one or more resources associated with the second transmit power level based on the correlation satisfying the threshold, where the first quantity and the second quantity may be equal.

In some examples of the method, apparatuses, and non-transitory computer-readable medium described herein, transmitting the first report may include operations, features, means, or instructions for transmitting the first report indicating the second average measurement of the one or more resources associated with the second transmit power level based on the correlation failing to satisfy the threshold, where the first quantity may be greater than or equal to the second quantity.

A method for wireless communication at a network entity is described. The method may include transmitting a first message indicating that a configuration of a time restriction is disabled at a UE, where the UE measures one or more resources with respect to a reference resource when the configuration associated with the time restriction is disabled, transmitting a second message indicating that the UE is to measure the one or more resources transmitted by the network entity at a first transmit power level of a set of multiple transmit power levels, where the reference resource is associated with one of the set of multiple transmit power levels, and receiving a first report indicating a first average measurement of the one or more resources associated with the first transmit power level, where the UE measures the one or more resources based on the second message.

An apparatus for wireless communication at a network entity is described. The apparatus may include a processor, memory coupled with the processor, and instructions stored in the memory. The instructions may be executable by the processor to cause the apparatus to transmit a first message indicating that a configuration of a time restriction is disabled at a UE, where the UE measures one or more resources with respect to a reference resource when the configuration associated with the time restriction is disabled, transmit a second message indicating that the UE is to measure the one or more resources transmitted by the network entity at a first transmit power level of a set of multiple transmit power levels, where the reference resource is associated with one of the set of multiple transmit power levels, and receive a first report indicating a first average measurement of the one or more resources associated with the first transmit power level, where the UE measures the one or more resources based on the second message.

Another apparatus for wireless communication at a network entity is described. The apparatus may include means for transmitting a first message indicating that a configuration of a time restriction is disabled at a UE, where the UE measures one or more resources with respect to a reference resource when the configuration associated with the time restriction is disabled, means for transmitting a second message indicating that the UE is to measure the one or more resources transmitted by the network entity at a first transmit power level of a set of multiple transmit power levels, where the reference resource is associated with one of the set of multiple transmit power levels, and means for receiving a first report indicating a first average measurement of the one or more resources associated with the first transmit power level, where the UE measures the one or more resources based on the second message.

A non-transitory computer-readable medium storing code for wireless communication at a network entity is described. The code may include instructions executable by a processor to transmit a first message indicating that a configuration of a time restriction is disabled at a UE, where the UE measures one or more resources with respect to a reference resource when the configuration associated with the time restriction is disabled, transmit a second message indicating that the UE is to measure the one or more resources transmitted by the network entity at a first transmit power level of a set of multiple transmit power levels, where the reference resource is associated with one of the set of multiple transmit power levels, and receive a first report indicating a first average measurement of the one or more resources associated with the first transmit power level, where the UE measures the one or more resources based on the second message.

In some examples of the method, apparatuses, and non-transitory computer-readable medium described herein, receiving the first report may include operations, features, means, or instructions for receiving the first report indicating the first average measurement of the one or more resources associated with the first transmit power level and receiving a second report indicating a second average measurement of the one or more resources associated with a second transmit power level.

In some examples of the method, apparatuses, and non-transitory computer-readable medium described herein, receiving the first report may include operations, features, means, or instructions for receiving the first report indicating the first average measurement of the one or more resources associated with the first transmit power level, where a first quantity of the one or more resources associated with the first transmit power level may be larger than a second quantity of the one or more resources associated with a second transmit power level.

In some examples of the method, apparatuses, and non-transitory computer-readable medium described herein, a third transmit power level that occurs after the second transmit power level in a time domain may be equal to the first transmit power level.

In some examples of the method, apparatuses, and non-transitory computer-readable medium described herein, receiving the first report may include operations, features, means, or instructions for receiving the first report indicating the first average measurement of the one or more resources, where the first average measurement may be in terms of a second transmit power level based on a power scale, where the power scale associates the first average measurement with the second transmit power level.

In some examples of the method, apparatuses, and non-transitory computer-readable medium described herein, a third transmit power level that occurs after the second transmit power level in a time domain may be equal to the second transmit power level.

In some examples of the method, apparatuses, and non-transitory computer-readable medium described herein, receiving the first report may include operations, features, means, or instructions for receiving the first report indicating the first average measurement of the one or more resources associated with the first transmit power level based on a correlation between the first average measurement and a second average measurement of the one or more resources associated with a second transmit power level satisfying a threshold, where a first quantity of the one or more resources associated with the first transmit power level may be larger than a second quantity of the one or more resources associated with the second transmit power level.

In some examples of the method, apparatuses, and non-transitory computer-readable medium described herein, receiving the first report may include operations, features, means, or instructions for receiving the first report indicating the second average measurement of the one or more resources associated with the second transmit power level based on the correlation satisfying the threshold, where the first quantity and the second quantity may be equal.

In some examples of the method, apparatuses, and non-transitory computer-readable medium described herein, receiving the first report may include operations, features, means, or instructions for receiving the first report indicating the second average measurement of the one or more resources associated with the second transmit power level based on the correlation failing to satisfy the threshold, where the first quantity may be greater than or equal to the second quantity.

DETAILED DESCRIPTION

Figure 1:
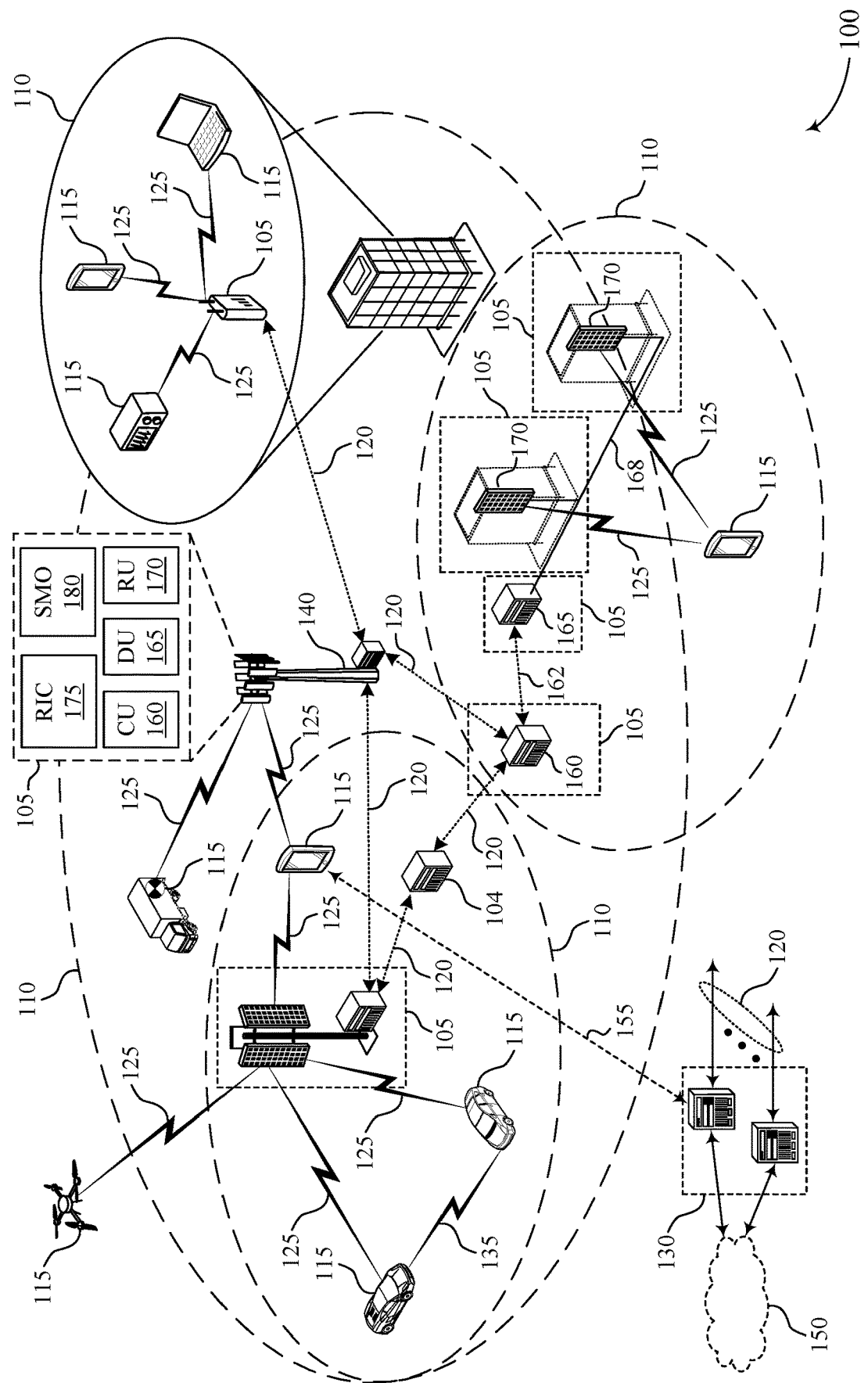
FIG. 1 illustrates an example of a wireless communications system that supports channel state information (CSI) reporting and time restriction in accordance with one or more aspects of the present disclosure.

A network entity may use different modes and operations to save energy and power and maintain network operations. To improve energy savings, a user equipment (UE) may provide support or feedback to the network entity regarding channel conditions and other information. For example, the UE may provide a channel state information (CSI) report to the network entity, which may include channel measurements. In some examples, the UE may perform average measurements of resources transmitted by the network entity before a CSI reference resource if the network entity disables a time restriction parameter (e.g., timeRestrictionForChannelMeasurements) for the UE. That is, if time restriction is disabled (e.g., not configured) for the UE, the UE may perform average measurements of one or more resources for reporting to the network entity instead of measuring a most recent resource with respect to the CSI reference resource. However, if the network entity changes a transmit power level it uses to transmit the resources to the UE, the UE may lack the ability to average measurements of resources transmitted by the network entity across different transmit power levels because of a phase discontinuity between the transmit power levels. For example, the UE may lack a scaling power able to scale the measurements of resources the network entity transmits with different transmit power levels to the same power level for reporting. As such, the channel measurements may lack accuracy and efficiency, which may decrease energy savings at the network entity.

Techniques described herein enable a UE to report average measurements of resources to a network entity when a time restriction parameter (e.g., timeRestrictionForChannelMeasurements) is disabled (e.g., not configured) and when the network entity transmits the resources to the UE at different transmit power levels. The UE may receive a first message (e.g., a radio resource control (RRC) configuration message) indicating that the time restriction parameter is disabled for the UE, and indicating how far back in time (e.g., during which transmit power level) the UE is to measure one or more resources in a channel. In addition, the network entity may transmit the one or more resources for measurement by the UE in the channel before a CSI reference resource (e.g., the CSI reference resource may represent an end of a measurement window for the UE). In some examples, the UE may measure and report average measurements of the one or more resources transmitted by the network entity at a first power level, and the UE may reset the average measurement and reporting for one or more additional resources the network entity may transmit at a second power level.

If the channel has relatively small variations in average measurements of resources transmitted at different transmit power levels, the UE may include average measurements of one or more resources transmitted by the network entity at a particular transmit power level based on one or more rules. For example, the UE may include particular average measurements in a report to the network entity based on when the network entity transmitted one or more resources at a particular transmit power level, and how many resources the network entity transmits at each transmit power level, among other rules. For example, if the network entity transmits an equal quantity of resources at two different transmit power levels, the UE may measure the one or more resources associated with the transmit power level that the network entity used most recently before the CSI reference resource. If the channel has significant variations at different transmit power levels, the UE may include average measurements of the most recently transmitted resources at a particular transmit power level regardless of the quantity of resources transmitted at the transmit power level, as an average measurement may more accurately represent current channel conditions.

Aspects of the subject matter described herein may be implemented to realize one or more of the following potential improvements, among others. The techniques employed by the described communication devices may enable CSI time restriction for energy savings, which may support improved communications between a UE and a network entity. For example, by reporting average measurements of resources transmitted in a channel by the network entity at a particular transmit power level based on a set of rules, the UE may improve accuracy of channel measurements. Additionally, reporting more accurate channel measurements may enable the network entity to more efficiently use different modes and operations for increased power savings, among other benefits.

Aspects of the disclosure are initially described in the context of wireless communications systems. Aspects of the disclosure are then described in the context of timelines and process flows. Aspects of the disclosure are further illustrated by and described with reference to apparatus diagrams, system diagrams, and flowcharts that relate to CSI reporting and time restriction.

FIG. 1 illustrates an example of a wireless communications system 100 that supports CSI reporting and time restriction in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT MC), a Non-Real Time RIC (Non-RT MC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support CSI reporting and time restriction as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)).

Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

Some network entities 105 may use energy saving features to reduce energy consumption and maintain network operations in a wireless network, such as a massive MIMO communications system. For example, a network entity 105 may enter different sleep modes or activate different sleep modes for one or more components of the network entity 105 to save power, which may be based on traffic conditions of one or more UEs 115 in communication with the network entity 105. In some examples, the network entity 105 and the UE 115 may increase network energy savings based on transmission and reception at the network entity 105. For example, the network entity 105 may employ energy saving techniques in the time, frequency, spatial, and power domains, where the UE 115 may provide UE assistance information (UAI) to support increased energy savings at the network entity 105. In some examples, the network entity 105 may more efficiently reduce its capabilities (e.g., by entering an energy saving state) and subsequently reduce energy consumption when the network entity 105 is in communication with relatively few UEs 115 with relatively low traffic loads. The network entity 105 may enter an energy saving state based on the quantity of UEs 115 and corresponding traffic loads. In some examples, an energy saving state may include activating a sleep mode, reducing a quantity of antennas, reducing transmission bandwidth, reducing transmission power, or any combination of one or more techniques that may enable the network entity 105 to save energy compared to when the network entity 105 is operating in a mode where each component may be operating normally.

In some examples, a UE 115 may perform channel measurements and interference measurements to support increased energy savings for the network entity 105. In some cases, the network entity 105 may configure a time restriction parameter (e.g., timeRestrictionForChannelMeasurements) in a report configuration (e.g., CSI-ReportConfig), where the time restriction parameter may enable time domain restriction for channel measurements. The time restriction parameter may indicate which reference signals the UE 115 may measure for including in a specific report to the network entity 105. That is, the time restriction parameter may indicate whether the UE 115 may average previous channel measurements in addition to current channel measurements, and whether the UE 115 may report the average measurement to the network entity 105. For example, if the channel measurements have a small variation and to achieve greater accuracy, the UE 115 may use averaging, however averaging may be less useful if the channel measurements have large variations. In some examples, the network entity 105 may configure a time restriction parameter to enable time domain restriction for interference measurements (e.g., timeRestrictionForinterferenceMeasurements).

In some examples, the time restriction parameter may indicate whether the UE 115 may average channel measurements based on a CSI reference resource. In the frequency domain, a CSI reference resource for a serving cell (e.g., corresponding to the network entity 105) may include a group of downlink physical resource blocks (PRBs) corresponding to a band that relates to some CSI. In the time domain, a CSI reference resource for CSI reporting in a particular uplink slot may be based on a particular downlink slot and one or more additional parameters (e.g., a subcarrier spacing configuration).

If the time restriction parameter for channel measurements is disabled (e.g., set to notConfigured in CSI-ReportConfig), the UE 115 may derive channel measurements for computing a channel quality value (e.g., a layer 1 (L1) reference signal received power (RSRP) value) reported in a particular uplink slot, based on previous synchronization signals (e.g., including primary synchronization signals (PSSs), secondary synchronization signals (SSSs), physical broadcast channels (PBCHs), demodulation reference signals (DMRSs)), or non-zero-power (NZP) CSI-RSs that occurred before the CSI reference resource. If the time restriction parameter for channel measurements is configured (e.g., set to Configured in CSI-ReportConfig), the UE 115 may derive the channel measurements for computing the channel quality reported in a particular uplink slot based on the single most recent occasion of a synchronization signal, PBCH, or NZP CSI-RS that occurred before the CSI reference resource. As such, the UE 115 may average the channel measurements when the time restriction parameter for channel measurements is configured (e.g., otherwise, the UE 115 may use the single most recent channel measurement). In addition, regardless of whether the time restriction parameter for channel measurements is configured for the UE 115, the UE 115 may refrain from measuring any resources that are later than the CIS reference resource.

In some examples, if the time restriction parameter for channel measurements is disabled for the UE 115, then the UE 115 may average any resource before a CSI reference resource. If the network entity 105 changes a transmit power (e.g., for network power savings), the UE 115 may be unable to average any resources that are transmitted by the network entity 105 with a different transmit power. For example, the network entity 105 changing its transmission power may cause a phase discontinuity in transmitted CSI-RS resources, which may disable the UE 115 from averaging the resources as the UE 115 may lack scaling capabilities to accurately average measurements from different transmit powers, and thus reduce the ability of the UE 115 to accurately report channel measurements.

The wireless communications system 100 may support a UE 115 reporting average measurements of resources to a network entity 105 when the time restriction parameter is disabled (e.g., not configured) for the UE 115, and when the network entity 105 transmits the resources to the UE 115 at different transmit power levels. The UE 115 may receive a first message (e.g., an RRC configuration message) indicating that the time restriction parameter is disabled for the UE 115, and indicating how far back in time (e.g., during which transmit power level) the UE 115 is to measure one or more resources transmitted by the network entity 105 in a channel. In addition, the network entity 105 may transmit the one or more resources for measurement by the UE 115 in the channel before a CSI reference resource (e.g., the CSI reference resource may represent an end of a measurement window for the UE 115). In some examples, the UE 115 may measure and report average measurements of the one or more resources transmitted by the network entity 105 at a first power level, and the UE 115 may reset the average measurement and reporting for one or more additional resources the network entity 105 may transmit at a second power level.

If the channel has relatively small variations in average measurements of resources transmitted at different transmit power levels, the UE 115 may include average measurements of one or more resources transmitted by the network entity 105 at a particular transmit power level based on one or more rules. For example, the UE 115 may include particular average measurements in a report to the network entity 105 based on when the network entity 105 transmitted one or more resources at a particular transmit power level, and how many resources the network entity 105 transmits at each transmit power level, among other rules. For example, if the network entity 105 transmits an equal quantity of resources at two different transmit power levels, the UE 115 may measure the one or more resources associated with the transmit power level that the network entity 105 used most recently before the CSI reference resource. If the channel has significant variations at different transmit power levels, the UE 115 may include average measurements of the most recently transmitted resources at a particular transmit power level regardless of the quantity of resources transmitted at the transmit power level, as an average measurement may more accurately represent current channel conditions.

Figure 2:
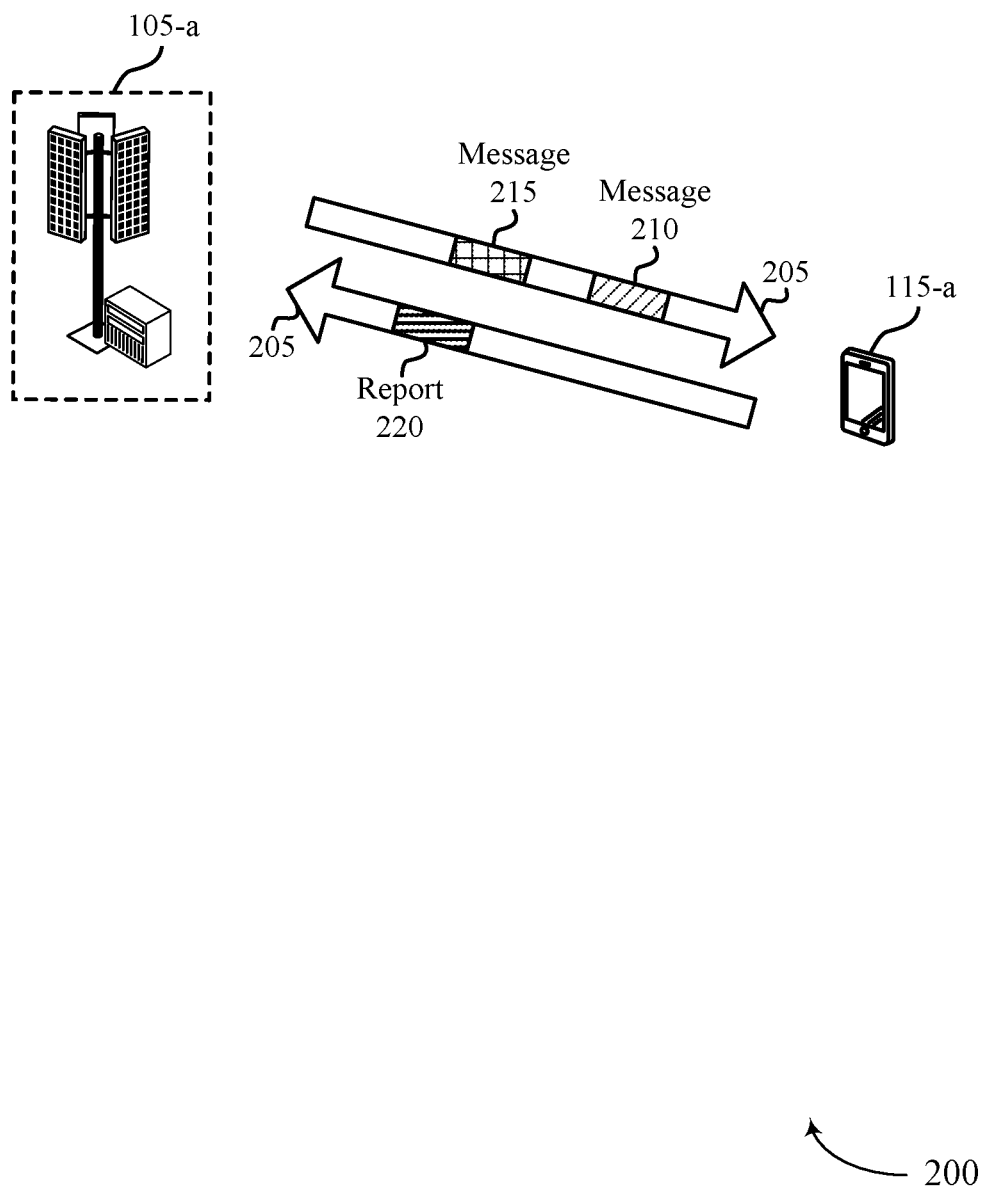
FIG. 2 illustrates an example of a wireless communications system that supports CSI reporting and time restriction in accordance with one or more aspects of the present disclosure.

FIG. 2 illustrates an example of a wireless communications system 200 that supports CSI reporting and time restriction in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-a and a network entity 105-a, which may be examples of corresponding devices described herein. In some examples, the UE 115-a may report channel measurements associated with different transmit power levels to the network entity 105-a when time restriction is disabled for the UE 115-a, which may increase energy savings at the network entity 105-a, among other benefits.

The wireless communications system 200 may support communications between the network entity 105-a and the UE 115-a. For example, the network entity 105-a may communicate signals (e.g., uplink and downlink transmissions) with the UE 115-a over respective communication links 205, which may be examples of a communication link 125 described with reference to FIG. 1. In some examples, the communication links 205 may support a channel between the UE 115-a and the network entity 105-a. For example, the network entity 105-a may transmit one or more resources (e.g., CSI resources) to the UE 115-*a* via the channel using one of multiple transmit power levels.

To support channel measurement reporting as described herein, the network entity 105-*a* may transmit a first message 210 to the UE 115-*a* indicating that a time restriction parameter (e.g., timeRestrictionForChannelMeasurements) is disabled (e.g., not configured) for the UE 115-*a*. When time restriction is disabled, the UE 115-*a* may measure one or more resources transmitted by the network entity 105-*a* with respect to a reference resource (e.g., a CSI reference resource) and report an average of the measurements to the network entity 105-*a*. Alternatively, when time restriction is configured for the UE 115-*a*, the UE 115-*a* may report a measurement of a most recent resource with respect to the reference resource. In some examples, the time restriction parameter may be included in a CSI report configuration (e.g., CSI-ReportConfig). As such, the network entity 105-*a* may indicate the CSI report configuration to the UE 115-*a* in the first message 210, where the time restriction parameter may be set to "notConfigured" in the CSI report configuration.

The UE 115-*a* may receive a second message 215 from the network entity 105-*a* indicating how far back in time the UE 115-*a* is to measure one or more resources. For example, the second message 215 may indicate that the UE 115-*a* is to measure one or more resources transmitted by the network entity 105-*a* at a first transmit power level (e.g., a legacy transmit power level) of two or more transmit power levels, where the reference resource may be associated with the first transmit power level or a different transmit power level. In addition, the network entity 105-*a* may indicate when the network entity 105-*a* changes power levels via a dynamic indication (e.g., downlink control information (DCI)). As such, the UE 115-*a* may use the dynamic indication to determine when the network entity 105-*a* changes transmit power levels instead of monitoring for power changes of transmissions from the network entity 105.

Using the information in the first message 210 and the second message 215, the UE 115-*a* may be configured to perform an average measurement of one or more resources transmitted by the network entity 105-*a* at a particular transmit power level and report the average measurement to the network entity 105-*a* in a report 220. In some examples, the UE 115-*a* may reset the averaging each time the network entity 105-*a* changes it transmit power level. That is, the UE 115-*a* may refrain from using resources of a previous transmit power level in an average measurement of a current transmit power level, where each measured resource occurs before the reference resource in time.

Alternatively, the UE 115-*a* may follow a set of rules when determining which resources to measure at which transmit power level, which may increase the accuracy of the average channel measurement the UE 115-*a* includes in the report 220. For example, if the channel measurements are relatively consistent for different transmit power levels (e.g., if the channel is not highly selective in time), the UE 115-*a* may measure the resources in a particular transmit power level based on when the network entity 105-*a* used that transmit power level (e.g., how recent the resources were transmitted with respect to the reference resource) and how many resources the network entity 105-*a* transmits at each transmit power level.

In some cases, the UE 115-*a* may measure one or more resources of the first transmit power level (e.g., the legacy transmit power level) and transmit the report 220 indicating an average of the measurements, where the first transmit power level may be associated with more resources than a second transmit power level (e.g., a reduced transmit power level). Alternatively, the UE 115-*a* may measure and report an average measurement of one or more resources transmitted at the second transmit power level if the second transmit power level is associated with more resources than the first transmit power level. As such, the UE 115-*a* may prioritize a quantity of resources and how far back in time the network entity 105-*a* used a transmit power level when determining which resources to measure at which transmit power levels. In some examples, the UE 115-*a* may report the average measurement of resources transmitted in the first transmit power level as measured (e.g., in the context of the first transmit power level), or the UE 115-*a* may scale the average measurement such that it is in the context of the second transmit power level, which may be based one which transmit power level the network entity 105-*a* uses after the second transmit power level.

Alternatively, if the channel measurements are significantly different for different transmit power levels (e.g., if the channel is highly selective in time), then the UE 115-*a* may measure one or more resources transmitted at the most recent transmit power level with respect to the reference resource as the most recently transmitted resources may more accurately represent current channel conditions than previously transmitted resources at a different transmit power level. Upon measuring one or more resources in a particular transmit power level based on the rules indicated in the second message 215, the UE 115-*a* may transmit the report 220 to the network entity 105-*a* indicating a first average measurement of the one or more measured resources.

By reporting channel measurements in this way, communications between the UE 115-*a* and the network entity 105-*a* may be improved. For example, by determining which resources to measure when time restriction is disabled based on one or more rules, the UE 115-*a* may perform more accurate channel measurements that correspond to relatively current channel conditions. Additionally, more accurate channel measurement reporting may increase energy savings at the network entity, among other benefits.

Figure 3:
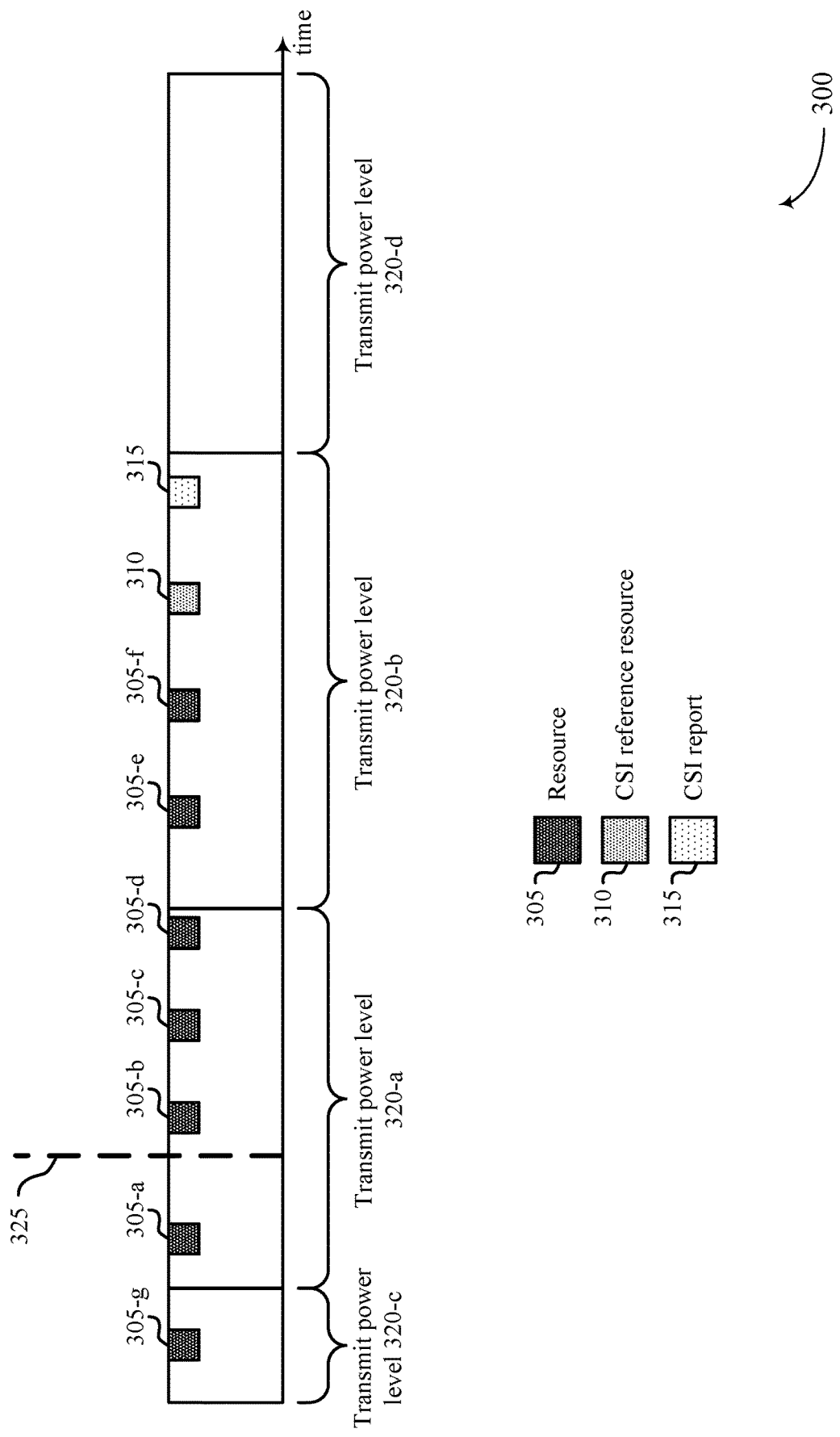
FIG. 3 illustrates an example of a timeline that supports CSI reporting and time restriction in accordance with one or more aspects of the present disclosure.

FIG. 3 illustrates an example of a timeline 300 that supports CSI reporting and time restriction in accordance with one or more aspects of the present disclosure. In some examples, the timeline 300 may implement aspects of the wireless communications systems 100 and 200 or may be implemented by aspects of the wireless communications systems 100 and 200. For example, a network entity may transmit resources 305 for measurement by the UE in accordance with the timeline 300, where the network entity may transmit the resources 305 at different transmit power levels 320.

As described with reference to FIG. 2, the network entity may transmit a message to the UE indicating that a time restriction parameter (e.g., timeRestrictionForChannelMeasurements) in a CSI report configuration is disabled for the UE, such that the UE may average measurements of one or more resources 305 at a transmit power level 320 for reporting to the network entity. Additionally, the network entity may indicate a set of rules for determining which resources 305 the UE is to measure. For example, the network entity may indicate how far back in time the UE is to measure one or more resources 305 at a transmit power level 320.

In some examples, the network entity may transmit one or more resources 305 at different transmit power levels 320 up to a CSI reference resource 310. That is, the network entity may transmit, and the UE may measure, the resources 305 transmitted before the CSI reference resource 310 in time, such that the CSI reference resource 310 may represent an end of a measurement window for the UE. The network entity may transmit a resource 305-*a*, a resource 305-*b*, a resource 305-*c*, and a resource 305-*d* at a transmit power level 320-*a* (e.g., a legacy transmit power level). In addition, the network entity may transmit a resource 305-*e* and a resource 305-*f* in a transmit power level 320-*b* (e.g., a reduced transmit power level), which may occur after the transmit power level 320-*a*. The network entity may transmit the CSI reference resource 310 at the transmit power level 320-*b*. In some cases, the network entity may transmit a resource 305-*g* at a transmit power level 320-*c*, which may occur before transmissions at the transmit power level 320-*a*. Additionally, or alternatively, the network entity may transmit one or more resources 305 at a transmit power level 320-*d*, which may occur after transmissions at the transmit power level 320-*b*. After performing measurements on one or more resources 305 transmitted before the CSI reference resource 310, the UE may transmit a CSI report 315 to the network entity indicating the channel measurement which may assist the network entity in increasing energy savings.

Because of a phase continuity that occurs between each transmit power level 320, the UE may lack the ability to average measurements of resources 305 transmitted at different transmit power levels 320. Accordingly, the UE may reset its average measurements each time the network entity changes is transmit power level 320, which the network entity may indicate to the UE via DCI. The UE may use average measurements instead of measurements of individual resources 305 as average measurements may provide more detailed and accurate information about the channel. For example, the UE may perform a first average measurement of the resource 305-*a*, the resource 305-*b*, the resource 305-*c*, and the resource 305-*d* transmitted by the network entity at the transmit power level 320-*a*. The UE may transmit a CSI report 315 (e.g., a first report) to the network entity indicating the first average measurement. In addition, the UE may perform a second average measurement of the resource 305-*e* and the resource 305-*f*, and transmit a CSI report 315 (e.g., a second report) to the network entity indicating the second average measurement. That is, the UE may report separate average measurements for resources 305 transmitted by the network entity at each transmit power level 320. As such, the UE may refrain from including resources 305 associated with a previous transmit power level in an average measurement of resources 305 associated with a current transmit power level, which may represent a restriction to the beginning of the measurement period for the UE.

In some cases, the UE may measure particular resources 305 based on one or more rules. For example, the UE may average measurements of one or resources 305 based on how many resources 305 the network entity transmits at each transmit power level 320, or based on when the network entity uses each transmit power level 320. In some examples, the UE may perform a first average measurement of the resource 305-*a*, the resource 305-*b*, the resource 305-*c*, and the resource 305-*d* at the transmit power level 320-*a* and include the first average measurement in the CSI report 315 based on a larger quantity of resources 305 (e.g., four resources 305) being transmitted at the transmit power level 320-*a* than at the transmit power level 320-*b* (e.g., two resources 305). That is, the UE may take an average measurement of the resources 305 transmitted at the transmit power level 320 that is associated with the largest quantity of resources 305 even though the network entity used the transmit power level 320-*a* before the transmit power level 320-*b*.

In some examples, the UE may report the first average measurement in terms of the transmit power level 320-*a* based on the transmit power level 320-*d* having the same transmit power (e.g., the legacy transmit power level) as the transmit power level 320-*a*. Thus, transmitting the CSI report 315 in the context of the transmit power level 320-*a*, where the network entity is to use the transmit power level 320-*d* to transmit future resources 305, may increase energy savings for the network entity by providing the network entity with information relevant to its current transmit power (e.g., which is the same for the transmit power level 320-*a* and the transmit power level 320-*d*).

Alternatively, the UE may apply a power scale to the first average measurement of the resource 305-*a*, the resource 305-*b*, the resource 305-*c*, and the resource 305-*d* at the transmit power level 320-*a*, where the power scale may scale the average measurement to the transmit power level 320-*b* (e.g., the reduced transmit power level). For example, if the UE is aware that the transmit power level 320-*d* has the same transmit power as the transmit power level 320-*b*, then the UE may apply the power scale to the first average measurement to associate the first average measurement with the transmit power level 320-*b*, and the UE may transmit the CSI report 315 indicating the first average measurement in terms of the transmit power level 320-*b*. As such, whether the UE applies the power scale to the first average measurement may be based on the transmit power level 320-*d*, and specifically, whether the transmit power level 320-*d* is the same as the transmit power level 320-*a* or the transmit power level 320-*b* (e.g., if the transmit power level 320-*d* is the same as the transmit power level 320-*a*, the UE may refrain from applying the power scale, and if the transmit power level 320-*d* is the same as the transmit power level 320-*b*, the UE may apply the power scale). In some examples, the network entity may transmit a message to the UE indicating whether or not the UE is to apply the power scale to the first average measurement, or the UE may be configured (e.g., via an RRC configuration) to apply or refrain from applying the power scale.

In some examples, the UE may determine which resources 305 to measure based on how much the channel varies over time. The UE may compare average measurements of resources 305 before and after a time 325 before the CSI reference resource 310. For example, the UE may compare an average measurement of the resource 305-*g* and the resource 305-*a* (e.g., resources 305 transmitted before the time 325) to an average measurement of the resource 305-*b*, the resource 305-*c*, the resource 305-*d*, the resource 305-*e*, and the resource 305-*f* (e.g., the resources 305 transmitted after the time 325). The UE may identify a correlation between the average measurements based on the comparison, and if the correlation satisfies a threshold, the channel may be relatively consistent over time and across different transmit power levels 320 (e.g., the channel may not be highly selective in time).

Based on the channel measurements being relatively consistent, the UE may include an average measurement of resources 305 at the transmit power level 320 with the largest quantity of resources 305 before or after the time 325. For example, if the transmit power level 320-*a* includes four resources 305, the transmit power level 320-*b* includes two resources 305, and the transmit power level 320-*c* includes one resource 305-*g*, the UE may include an average measurement of the resource 305-*a*, the resource 305-*b*, the resource 305-c, and the resource 305-d transmitted at the transmit power level 320-a in the CSI report 315. Alternatively, if the network entity transmitted five resources 305 at the transmit power level 320-c, the UE may include the average measurement of the five resources 305 transmitted at the transmit power level 320-c even though these may be earliest transmissions because the channel has little variance, and because the transmit power level 320-c is used to transmit the largest quantity of resources 305.

In some examples, if the channel measurements are relatively consistent and if each transmit power level 320 is associated with the same quantity of resources 305, the UE may include an average measurement of resources 305 corresponding to the most recent transmit power level 320. For example, if the transmit power level 320-a, the transmit power level 320-b, and the transmit power level 320-c were each associated with three resources 305, the UE may include an average measurement of the resources 305 transmitted at the transmit power level 320-b as that is the most recent transmit power level 320 used by the network entity before the CSI reference resource 310. As such, if the channel has relatively little variance, the UE may prioritize quantity of resources 305 over the time the resources 305 were transmitted until each transmit power level 320 is associated with the same quantity of resources 305, in which case the UE may prioritize the transmission time.

Alternatively, the UE may compare the average measurement of the measurement resource 305-g and the resource 305-a (e.g., the resources 305 before the time 325) to the average measurement of the resource 305-b, the resource 305-c, the resource 305-d, the resource 305-e, and the resource 305-f (e.g., the resources 305 after the time 325). The UE may identify the correlation between the average measurements based on the comparison, and if the correlation fails to satisfy a threshold, the channel may be vary significantly over time and across different transmit power levels 320 (e.g., the channel may be highly selective in time).

Based on the channel measurements being significantly different before and after the time 325, the UE may refrain from reporting average measurements of resources 305 transmitted before the time 325. Instead, if the channel is relatively consistent after the time 325 (e.g., across the transmit power level 320-a and the transmit power level 320-b), the UE may determine whether to include an average measurement for the resources 305 in the transmit power level 320-a and the transmit power level 320-b after the time 325 in the CSI report 315 based on the rules as described herein. For example, if the network entity uses the transmit power level 320-a to transmit more resources 305 than the transmit power level 320-b, the UE may include an average measurement for resources 305 transmitted at the transmit level 320-b in the CSI report 315. Alternatively, if the network entity uses the transmit power level 320-a and the transmit power level 320-b to transmit an equal quantity of resources 305, the UE may include an average measurement for resources 305 transmitted at the transmit power level 320-b as that is the transmit power level 320-b used most recently with respect to the CSI reference resource 310. As such, the UE may determine a tradeoff between how far back in time to perform average measurements of resources 305 and the quantity of resources 305 the network entity transmits at each transmit power level 320.

Figure 4:
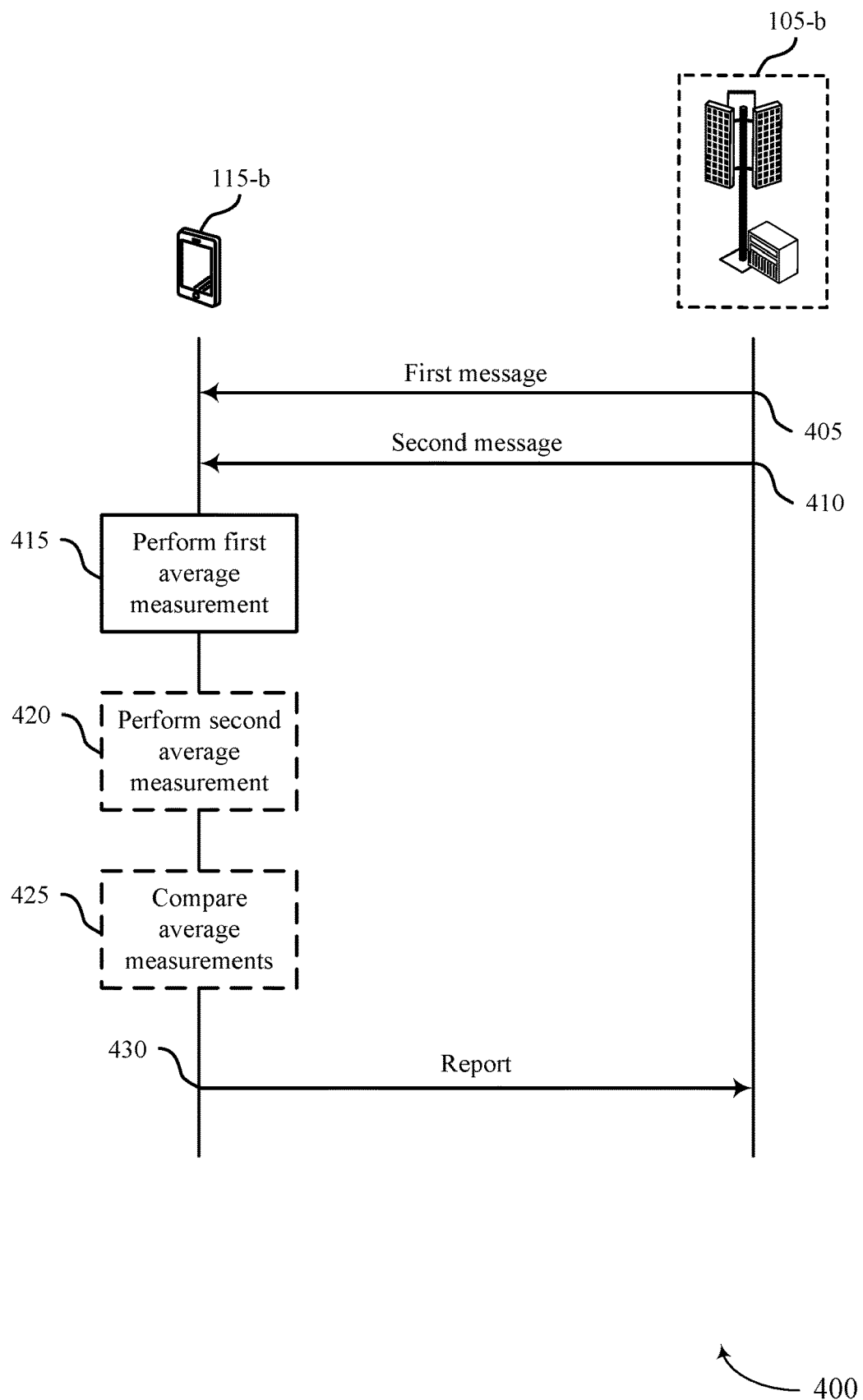
FIG. 4 illustrates an example of a process flow that supports CSI reporting and time restriction in accordance with one or more aspects of the present disclosure.

FIG. 4 illustrates an example of a process flow 400 that supports CSI reporting and time restriction in accordance with one or more aspects of the present disclosure. The process flow 400 may implement aspects of wireless communications systems 100 and 200, or may be implemented by aspects of the wireless communications systems 100 and 200. For example, the process flow 400 may illustrate operations between a UE 115-b and a network entity 105-b, which may be examples of corresponding devices described herein. In the following description of the process flow 400, the operations between the UE 115-b and the network entity 105-b may be transmitted in a different order than the example order shown, or the operations performed by the UE 115-b and the network entity 105-b may be performed in different orders or at different times. Some operations may also be omitted from the process flow 400, and other operations may be added to the process flow 400.

At 405, the UE 115-b may receive a first message from the network entity 105-b indicating a configuration associated with a time restriction (e.g., timeRestrictionForChannelMeasurements in CSI-ReportConfig) is disabled for the UE 115-b, where the UE 115-b measures one or more resources with respect to a reference resource when the configuration associated with the time restriction is disabled. That is, when time restriction is disabled (e.g., not configured) for the UE 115-b, the UE 115-b may measure one or more resources transmitted by the network entity 105-b at a particular transmit power level, where the network entity 105-b transmits the one or more resources before the reference resource.

At 410, the UE 115-b may receive a second message from the network entity 105-b indicating that the UE 115-b is to measure the one or more resources transmitted by the network entity 105-b at a first transmit power level of multiple transmit power levels, where the reference resource is associated with one of the multiple transmit power levels. For example, the second message may indicate how far back in time the UE 115-b is to measure the one or more resources by indicating which transmit power level is associated with the resources, which may be determined based on a set of rules.

At 415, the UE 115-b may perform a first average measurement of the one or more resources associated with the first transmit power level (e.g., a legacy transmit power level) where the one or more resources may be transmitted by the network entity 105-b before the reference resource. In some examples, the UE 115-b may apply a power scale to the first average measurement to scale the first average measurement to the second transmit power level. In some cases, the UE 115-b may perform the first average measurement based on the second message and the set of rules.

At 420, the UE 115-b may perform a second average measurement of the one or more resources associated with the second transmit power level (e.g., a reduced transmit power level) where the one or more resources may be transmitted by the network entity 105-b before the reference resource and after the one or more resources transmitted at the first transmit power level. In some examples, the UE 115-b may perform the second average measurement based on the second message and the set of rules.

At 425, the UE 115-b may compare the first average measurement and the second average measurement to identify a correlation between the first and second average measurements. The correlation may satisfy (e.g., exceed) a threshold, indicating that a channel used to transmit the one or more resources transmitted at each transmit power level varies relatively little (e.g., is not highly selective in time), or the correlation may fail to satisfy a threshold, indicating that the channel is differs significantly in time (e.g., is highly selective in time).

At 430, the UE 115-b may transmit a first report to the network entity 105-b indicating the first average measurement of the one or more resources associated with the first transmit power level. In some examples, the UE 115-b may transmit a second report to the network entity 105-b indicating the second average measurement of the one or more resources associated with the second transmit power level. In some cases, the UE 115-b may transmit a report indicating the first or second average measurement based on the correlation satisfying or failing to satisfy the threshold, when the first or second transmit power level was used, and how many resources the network entity 105-b transmitted at each transmit power level.

Figure 5:
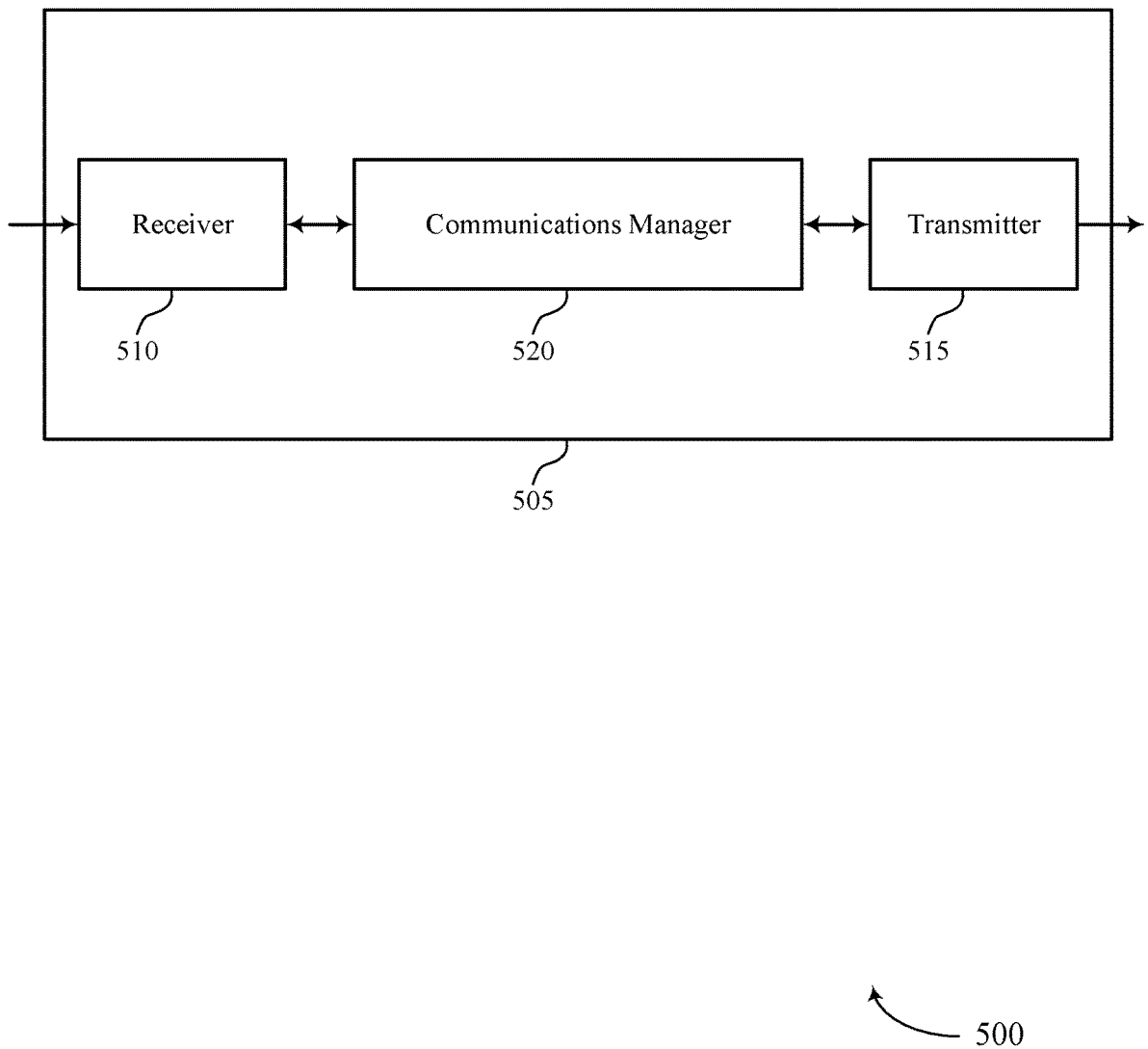
FIGS. 5 and 6 show block diagrams of devices that support CSI reporting and time restriction in accordance with one or more aspects of the present disclosure.

FIG. 5 shows a block diagram 500 of a device 505 that supports CSI reporting and time restriction in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to CSI reporting and time restriction). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to CSI reporting and time restriction). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of CSI reporting and time restriction as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving a first message indicating a configuration associated with a time restriction is disabled for the UE, where the UE measures one or more resources with respect to a reference resource when the configuration associated with the time restriction is disabled. The communications manager 520 may be configured as or otherwise support a means for receiving a second message indicating that the UE is to measure the one or more resources transmitted by a network entity at a first transmit power level of a set of multiple transmit power levels, where the reference resource is associated with one of the set of multiple transmit power levels. The communications manager 520 may be configured as or otherwise support a means for transmitting a first report indicating a first average measurement of the one or more resources associated with the first transmit power level, where the UE measures the one or more resources based on the second message.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for CSI reporting when a time restriction parameter is disabled for a UE, which may increase accuracy efficiency of channel measurements by the UE and thus, increase energy savings at a network entity.

Figure 6:
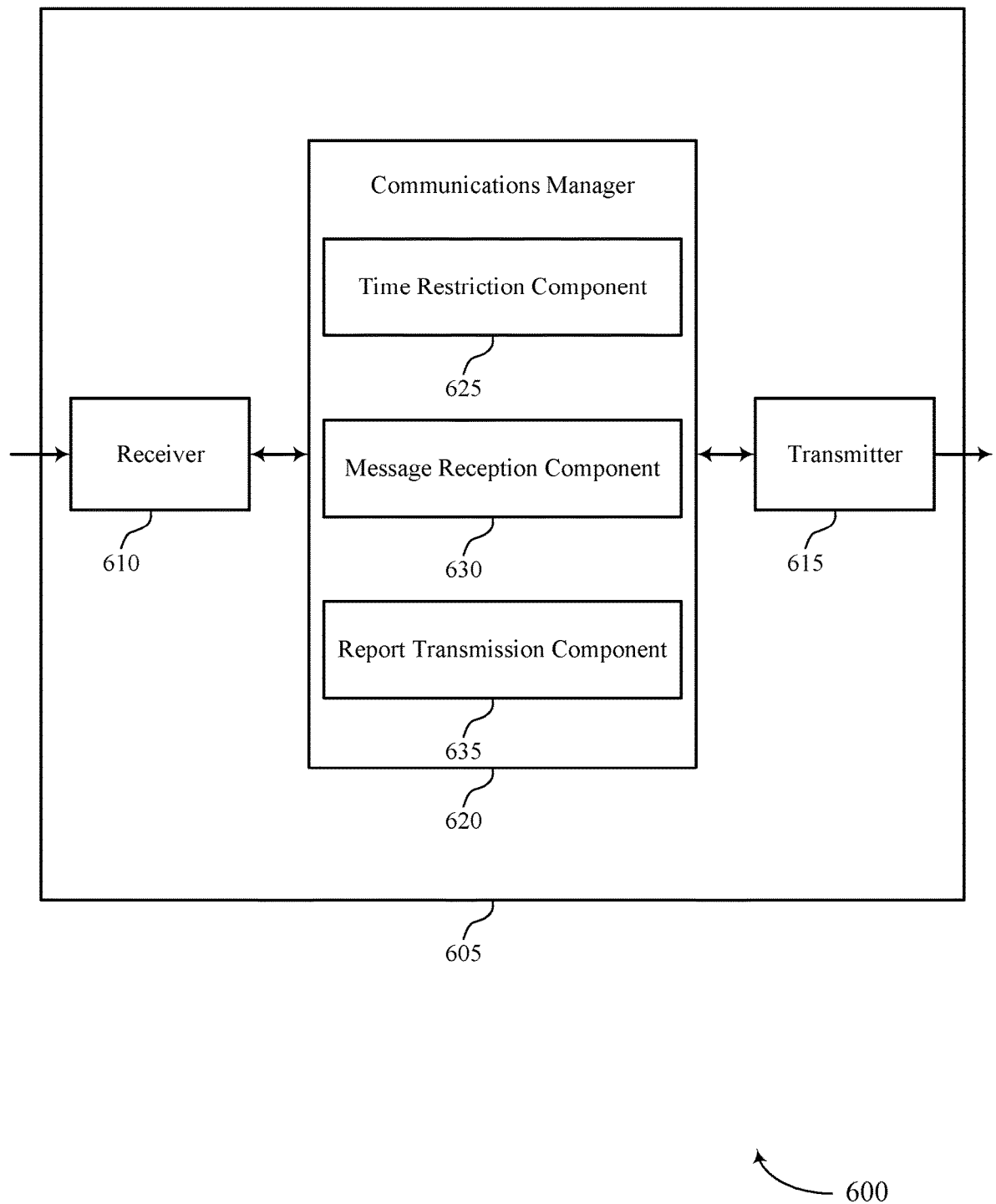

FIG. 6 shows a block diagram 600 of a device 605 that supports CSI reporting and time restriction in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to CSI reporting and time restriction). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to CSI reporting and time restriction). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of CSI reporting and time restriction as described herein. For example, the communications manager 620 may include a time restriction component 625, a message reception component 630, a report transmission component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The time restriction component 625 may be configured as or otherwise support a means for receiving a first message indicating a configuration associated with a time restriction is disabled for the UE, where the UE measures one or more resources with respect to a reference resource when the configuration associated with the time restriction is disabled. The message reception component 630 may be configured as or otherwise support a means for receiving a second message indicating that the UE is to measure the one or more resources transmitted by a network entity at a first transmit power level of a set of multiple transmit power levels, where the reference resource is associated with one of the set of multiple transmit power levels. The report transmission component 635 may be configured as or otherwise support a means for transmitting a first report indicating a first average measurement of the one or more resources associated with the first transmit power level, where the UE measures the one or more resources based on the second message.

Figure 7:
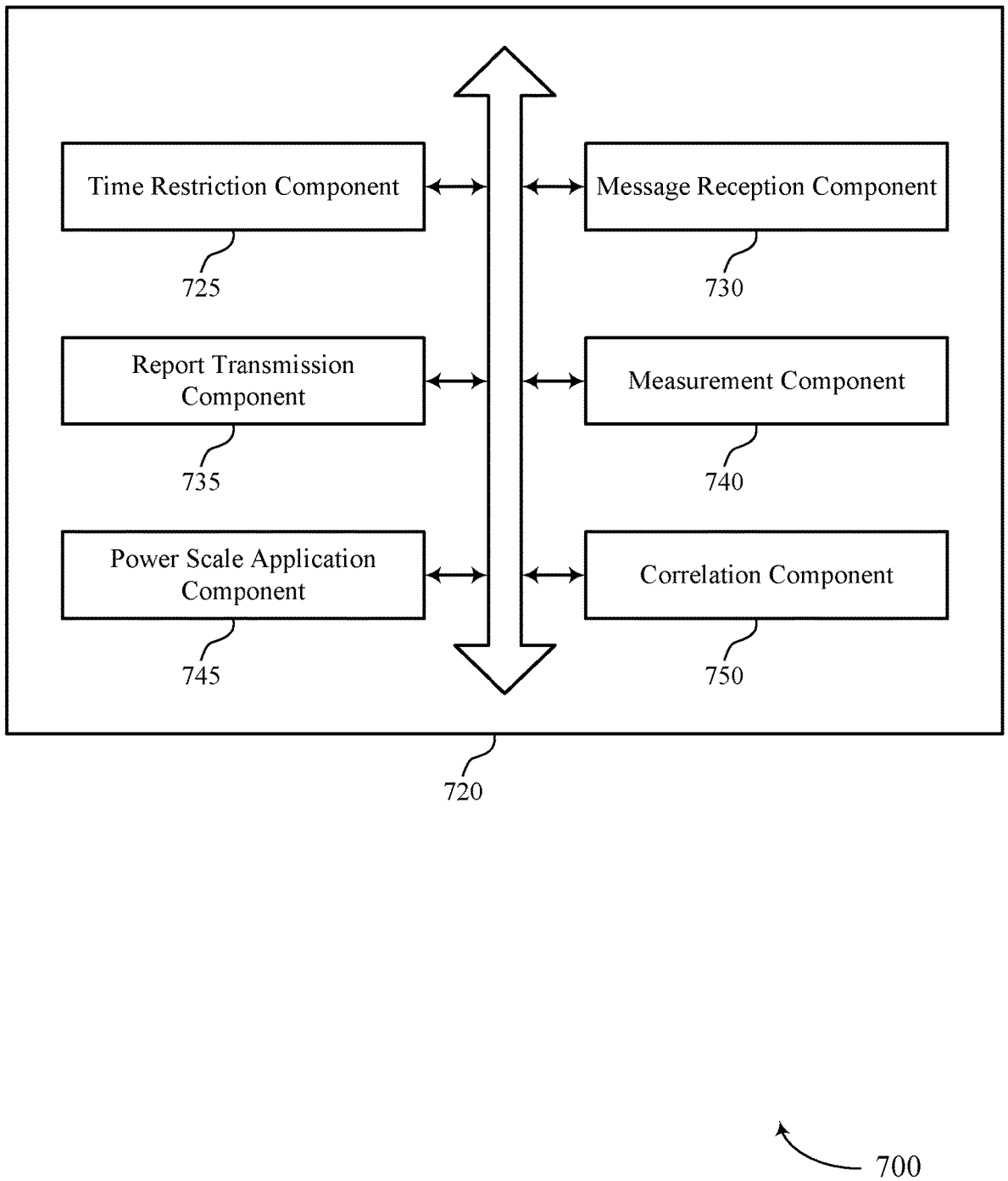
FIG. 7 shows a block diagram of a communications manager that supports CSI reporting and time restriction in accordance with one or more aspects of the present disclosure.

FIG. 7 shows a block diagram 700 of a communications manager 720 that supports CSI reporting and time restriction in accordance with one or more aspects of the present disclosure. The communications manager 720 may be an example of aspects of a communications manager 520, a communications manager 620, or both, as described herein. The communications manager 720, or various components thereof, may be an example of means for performing various aspects of CSI reporting and time restriction as described herein. For example, the communications manager 720 may include a time restriction component 725, a message reception component 730, a report transmission component 735, a measurement component 740, a power scale application component 745, a correlation component 750, or any combination thereof. Each of these components may communicate, directly or indirectly, with one another (e.g., via one or more buses).

The communications manager 720 may support wireless communication at a UE in accordance with examples as disclosed herein. The time restriction component 725 may be configured as or otherwise support a means for receiving a first message indicating a configuration associated with a time restriction is disabled for the UE, where the UE measures one or more resources with respect to a reference resource when the configuration associated with the time restriction is disabled. The message reception component 730 may be configured as or otherwise support a means for receiving a second message indicating that the UE is to measure the one or more resources transmitted by a network entity at a first transmit power level of a set of multiple transmit power levels, where the reference resource is associated with one of the set of multiple transmit power levels. The report transmission component 735 may be configured as or otherwise support a means for transmitting a first report indicating a first average measurement of the one or more resources associated with the first transmit power level, where the UE measures the one or more resources based on the second message.

In some examples, the measurement component 740 may be configured as or otherwise support a means for performing the first average measurement of the one or more resources associated with the first transmit power level, where the one or more resources associated with the first transmit power level occur before the reference resource in time. In some examples, the report transmission component 735 may be configured as or otherwise support a means for transmitting the first report indicating the first average measurement of the one or more resources associated with the first transmit power level. In some examples, the measurement component 740 may be configured as or otherwise support a means for performing a second average measurement of the one or more resources associated with a second transmit power level, where the one or more resources associated with the second transmit power level occur before the reference resource in a time domain. In some examples, the report transmission component 735 may be configured as or otherwise support a means for transmitting a second report indicating the second average measurement of the one or more resources associated with the second transmit power level.

In some examples, the measurement component 740 may be configured as or otherwise support a means for performing the first average measurement of the one or more resources associated with the first transmit power level, where a first quantity of the one or more resources associated with the first transmit power level is larger than a second quantity of the one or more resources associated with a second transmit power level. In some examples, the report transmission component 735 may be configured as or otherwise support a means for transmitting the first report indicating the first average measurement of the one or more resources associated with the first transmit power level. In some examples, a third transmit power level that occurs after the second transmit power level in a time domain is equal to the first transmit power level.

In some examples, the measurement component 740 may be configured as or otherwise support a means for performing the first average measurement of the one or more resources associated with the first transmit power level. In some examples, the power scale application component 745 may be configured as or otherwise support a means for applying a power scale to the first average measurement based on performing the first average measurement, where the power scale associates the first average measurement with a second transmit power level. In some examples, the report transmission component 735 may be configured as or otherwise support a means for transmitting the first report indicating the first average measurement of the one or more resources, where the first average measurement is in terms of the second transmit power level based on applying the power scale. In some examples, a third transmit power level that occurs after the second transmit power level in a time domain is equal to the second transmit power level.

In some examples, the measurement component 740 may be configured as or otherwise support a means for performing the first average measurement of the one or more resources associated with the first transmit power level and a second average measurement of the one or more resources associated with a second transmit power level. In some examples, the correlation component 750 may be configured as or otherwise support a means for comparing the first average measurement and the second average measurement to identify a correlation between the first average measurement and the second average measurement. In some examples, the report transmission component 735 may be configured as or otherwise support a means for transmitting the first report indicating the first average measurement of the one or more resources associated with the first transmit power level based on the correlation satisfying a threshold, where a first quantity of the one or more resources associated with the first transmit power level is larger than a second quantity of the one or more resources associated with the second transmit power level.

In some examples, to support transmitting the first report, the report transmission component 735 may be configured as or otherwise support a means for transmitting the first report indicating the second average measurement of the one or more resources associated with the second transmit power level based on the correlation satisfying the threshold, where the first quantity and the second quantity are equal.

In some examples, to support transmitting the first report, the report transmission component 735 may be configured as or otherwise support a means for transmitting the first report indicating the second average measurement of the one or more resources associated with the second transmit power level based on the correlation failing to satisfy the threshold, where the first quantity is greater than or equal to the second quantity.

Figure 8:
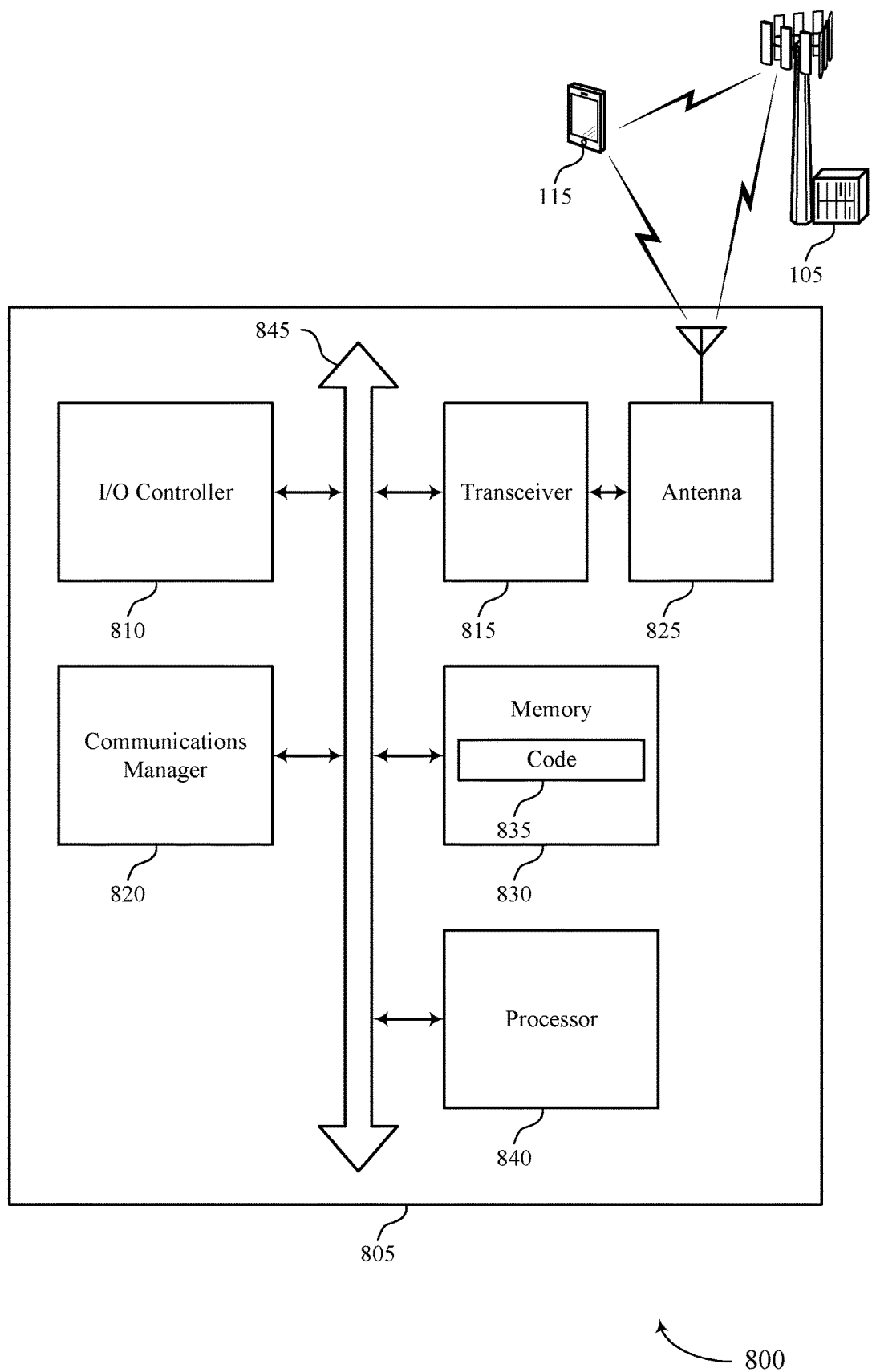
FIG. 8 shows a diagram of a system including a device that supports CSI reporting and time restriction in accordance with one or more aspects of the present disclosure.

FIG. 8 shows a diagram of a system 800 including a device 805 that supports CSI reporting and time restriction in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting CSI reporting and time restriction). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving a first message indicating a configuration associated with a time restriction is disabled for the UE, where the UE measures one or more resources with respect to a reference resource when the configuration associated with the time restriction is disabled. The communications manager 820 may be configured as or otherwise support a means for receiving a second message indicating that the UE is to measure the one or more resources transmitted by a network entity at a first transmit power level of a set of multiple transmit power levels, where the reference resource is associated with one of the set of multiple transmit power levels. The communications manager 820 may be configured as or otherwise support a means for transmitting a first report indicating a first average measurement of the one or more resources associated with the first transmit power level, where the UE measures the one or more resources based on the second message.

By including or configuring the communications manager 820 in accordance with examples as described herein, the device 805 may support techniques for CSI reporting when a time restriction parameter is disabled for a UE, which may increase accuracy efficiency of channel measurements by the UE and thus, increase energy savings at a network entity.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of CSI reporting and time restriction as described herein, or the processor 840 and the memory 830 may be otherwise configured to perform or support such operations.

Figure 9:
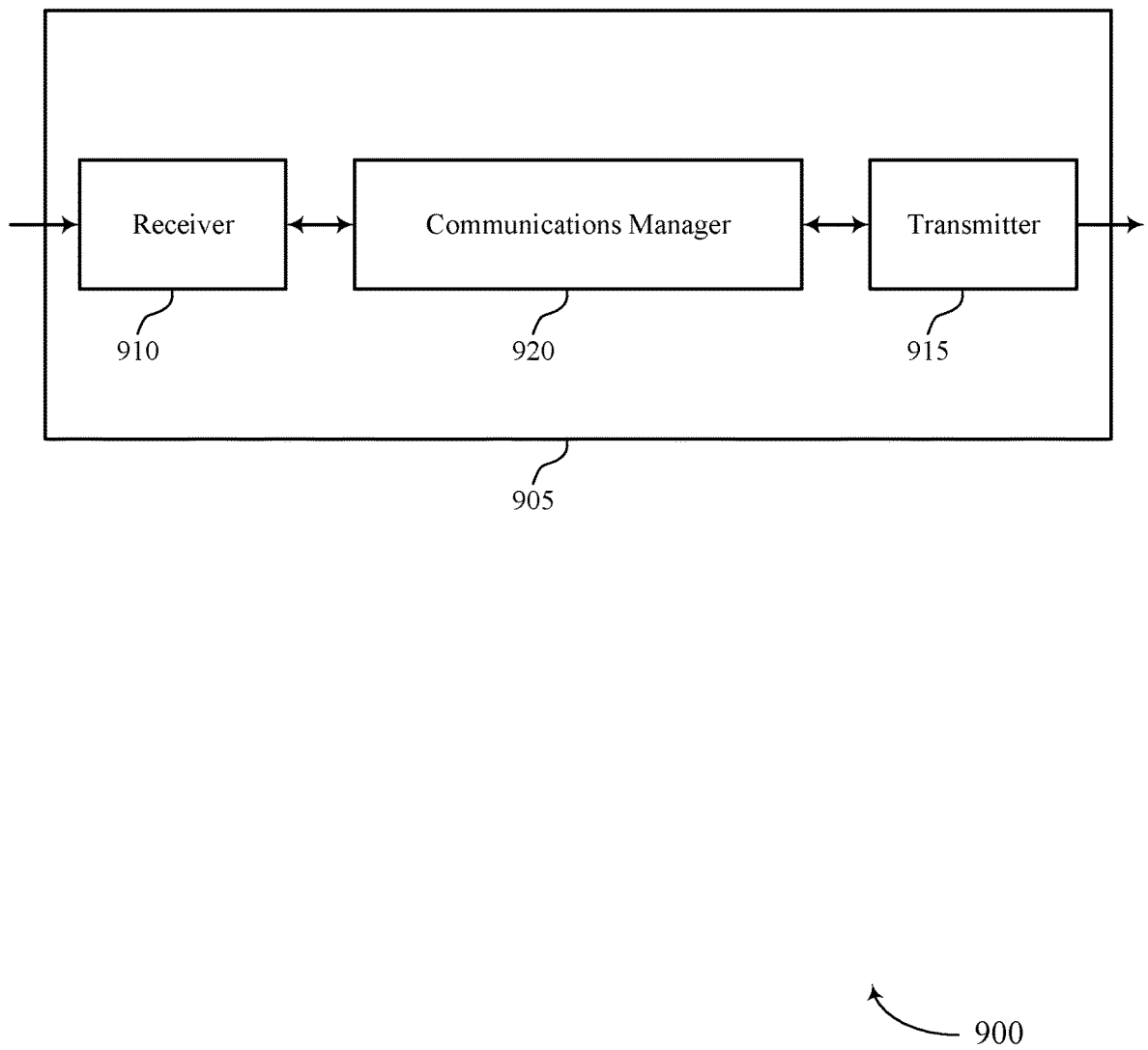
FIGS. 9 and 10 show block diagrams of devices that support CSI reporting and time restriction in accordance with one or more aspects of the present disclosure.

FIG. 9 shows a block diagram 900 of a device 905 that supports CSI reporting and time restriction in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of CSI reporting and time restriction as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting a first message indicating that a configuration of a time restriction is disabled at a UE, where the UE measures one or more resources with respect to a reference resource when the configuration associated with the time restriction is disabled. The communications manager 920 may be configured as or otherwise support a means for transmitting a second message indicating that the UE is to measure the one or more resources transmitted by the network entity at a first transmit power level of a set of multiple transmit power levels, where the reference resource is associated with one of the set of multiple transmit power levels. The communications manager 920 may be configured as or otherwise support a means for receiving a first report indicating a first average measurement of the one or more resources associated with the first transmit power level, where the UE measures the one or more resources based on the second message.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for CSI reporting when a time restriction parameter is disabled for a UE, which may increase accuracy efficiency of channel measurements by the UE and thus, increase energy savings at a network entity.

Figure 10:
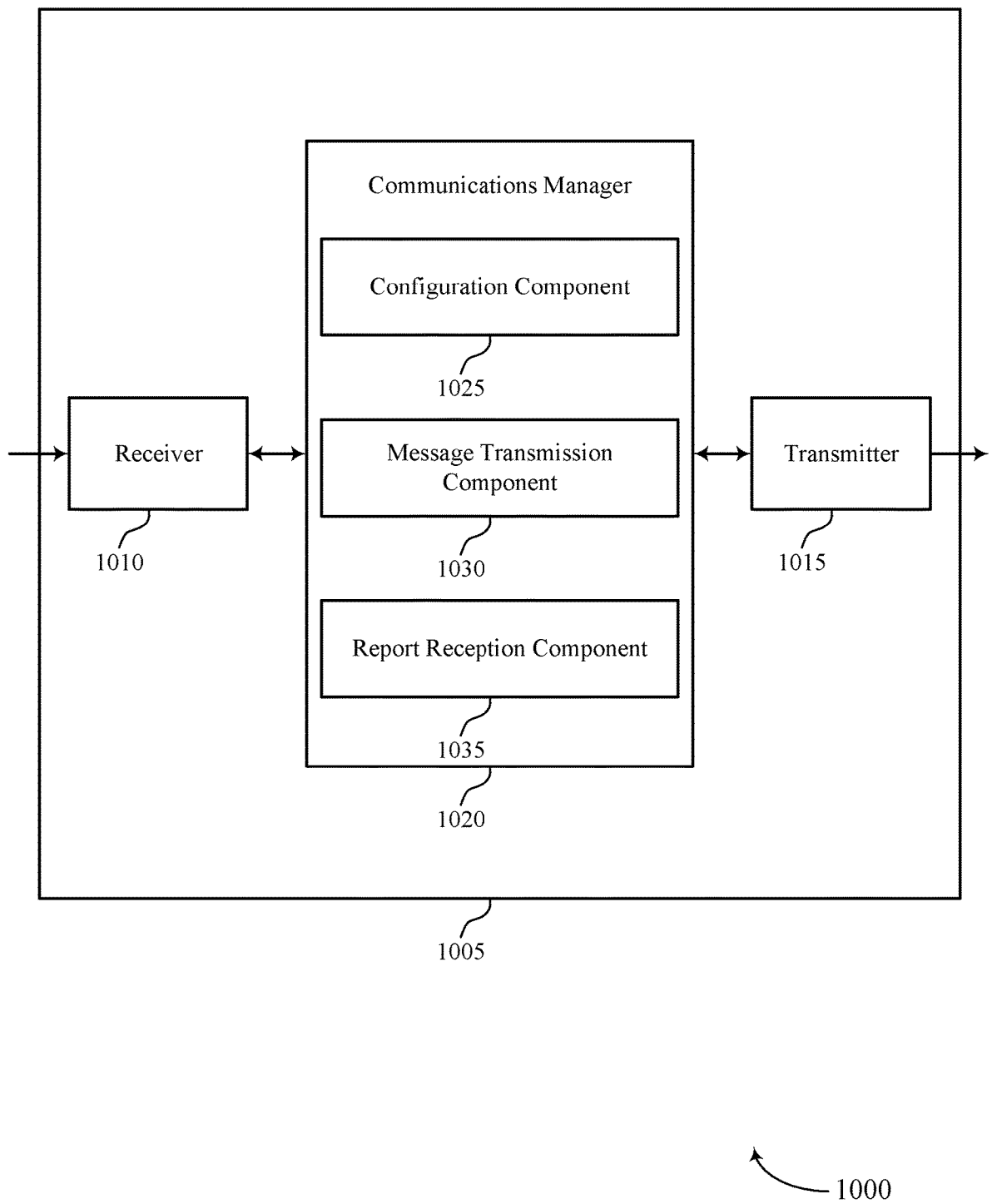

FIG. 10 shows a block diagram 1000 of a device 1005 that supports CSI reporting and time restriction in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of CSI reporting and time restriction as described herein. For example, the communications manager 1020 may include a configuration component 1025, a message transmission component 1030, a report reception component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The configuration component 1025 may be configured as or otherwise support a means for transmitting a first message indicating that a configuration of a time restriction is disabled at a UE, where the UE measures one or more resources with respect to a reference resource when the configuration associated with the time restriction is disabled. The message transmission component 1030 may be configured as or otherwise support a means for transmitting a second message indicating that the UE is to measure the one or more resources transmitted by the network entity at a first transmit power level of a set of multiple transmit power levels, where the reference resource is associated with one of the set of multiple transmit power levels. The report reception component 1035 may be configured as or otherwise support a means for receiving a first report indicating a first average measurement of the one or more resources associated with the first transmit power level, where the UE measures the one or more resources based on the second message.

Figure 11:
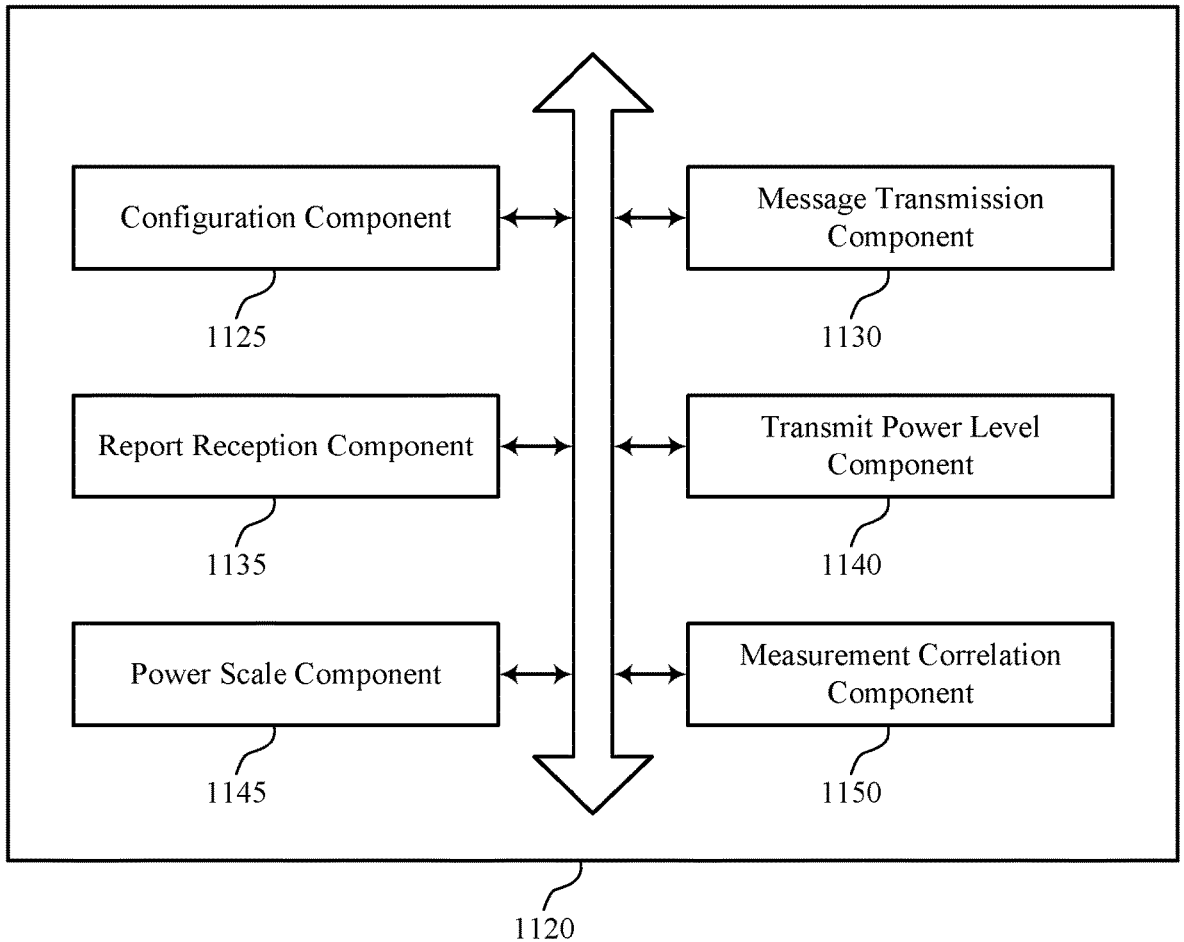
FIG. 11 shows a block diagram of a communications manager that supports CSI reporting and time restriction in accordance with one or more aspects of the present disclosure.

FIG. 11 shows a block diagram 1100 of a communications manager 1120 that supports CSI reporting and time restriction in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of CSI reporting and time restriction as described herein. For example, the communications manager 1120 may include a configuration component 1125, a message transmission component 1130, a report reception component 1135, a transmit power level component 1140, a power scale component 1145, a measurement correlation component 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The configuration component 1125 may be configured as or otherwise support a means for transmitting a first message indicating that a configuration of a time restriction is disabled at a UE, where the UE measures one or more resources with respect to a reference resource when the configuration associated with the time restriction is disabled. The message transmission component 1130 may be configured as or otherwise support a means for transmitting a second message indicating that the UE is to measure the one or more resources transmitted by the network entity at a first transmit power level of a set of multiple transmit power levels, where the reference resource is associated with one of the set of multiple transmit power levels. The report reception component 1135 may be configured as or otherwise support a means for receiving a first report indicating a first average measurement of the one or more resources associated with the first transmit power level, where the UE measures the one or more resources based on the second message.

In some examples, to support receiving the first report, the report reception component 1135 may be configured as or otherwise support a means for receiving the first report indicating the first average measurement of the one or more resources associated with the first transmit power level. In some examples, to support receiving the first report, the report reception component 1135 may be configured as or otherwise support a means for receiving a second report indicating a second average measurement of the one or more resources associated with a second transmit power level.

In some examples, to support receiving the first report, the transmit power level component 1140 may be configured as or otherwise support a means for receiving the first report indicating the first average measurement of the one or more resources associated with the first transmit power level, where a first quantity of the one or more resources associated with the first transmit power level is larger than a second quantity of the one or more resources associated with a second transmit power level. In some examples, a third transmit power level that occurs after the second transmit power level in a time domain is equal to the first transmit power level.

In some examples, to support receiving the first report, the power scale component 1145 may be configured as or otherwise support a means for receiving the first report indicating the first average measurement of the one or more resources, where the first average measurement is in terms of a second transmit power level based on a power scale, where the power scale associates the first average measurement with the second transmit power level.

In some examples, the power scale component 1145 may be configured as or otherwise support a means for a third transmit power level that occurs after the second transmit power level in a time domain is equal to the second transmit power level.

In some examples, to support receiving the first report, the measurement correlation component 1150 may be configured as or otherwise support a means for receiving the first report indicating the first average measurement of the one or more resources associated with the first transmit power level based on a correlation between the first average measurement and a second average measurement of the one or more resources associated with a second transmit power level satisfying a threshold, where a first quantity of the one or more resources associated with the first transmit power level is larger than a second quantity of the one or more resources associated with the second transmit power level.

In some examples, to support receiving the first report, the measurement correlation component 1150 may be configured as or otherwise support a means for receiving the first report indicating the second average measurement of the one or more resources associated with the second transmit power level based on the correlation satisfying the threshold, where the first quantity and the second quantity are equal.

In some examples, to support receiving the first report, the measurement correlation component 1150 may be configured as or otherwise support a means for receiving the first report indicating the second average measurement of the one or more resources associated with the second transmit power level based on the correlation failing to satisfy the threshold, where the first quantity is greater than or equal to the second quantity.

Figure 12:
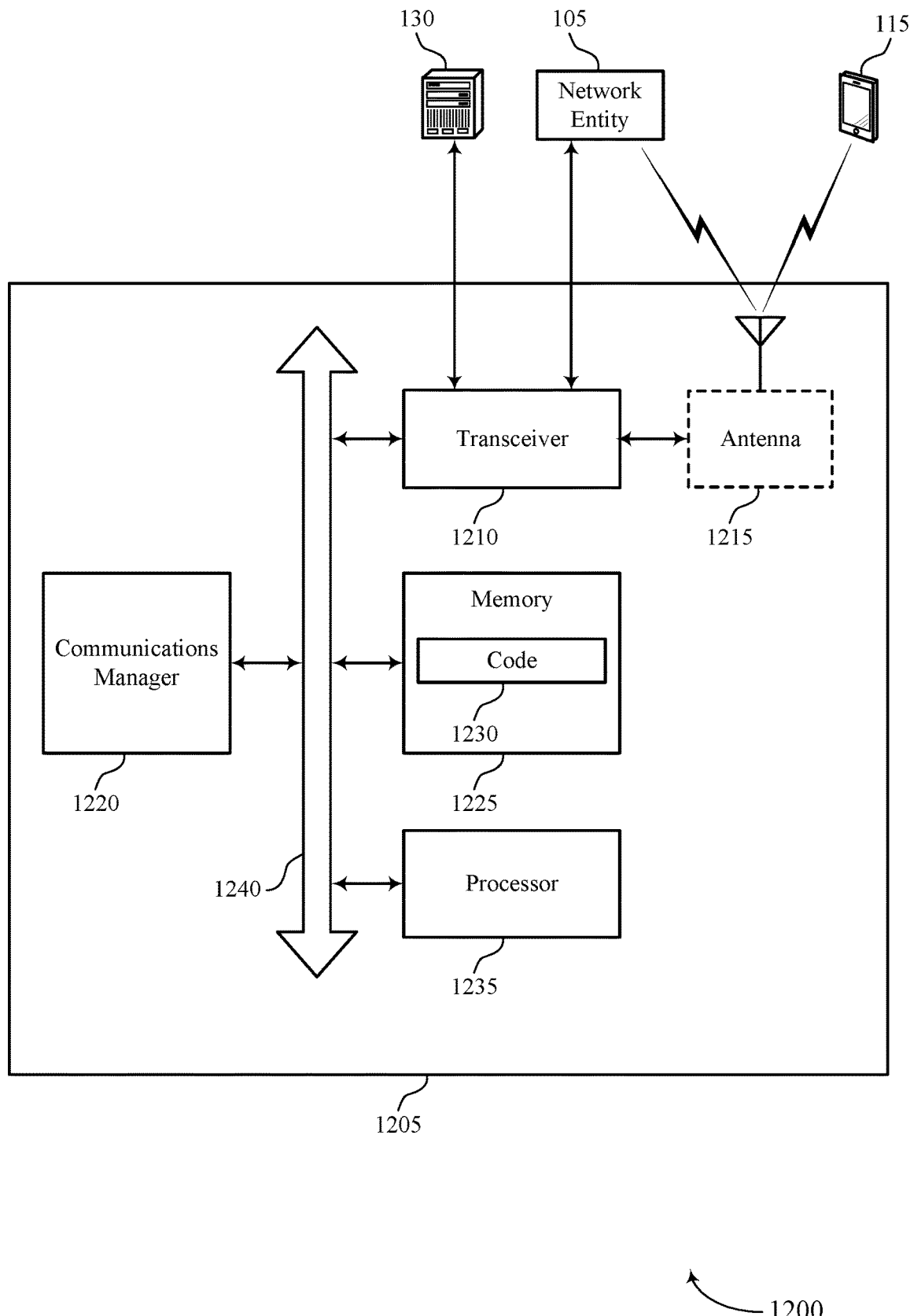
FIG. 12 shows a diagram of a system including a device that supports CSI reporting and time restriction in accordance with one or more aspects of the present disclosure.

FIG. 12 shows a diagram of a system 1200 including a device 1205 that supports CSI reporting and time restriction in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting CSI reporting and time restriction). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting a first message indicating that a configuration of a time restriction is disabled at a UE, where the UE measures one or more resources with respect to a reference resource when the configuration associated with the time restriction is disabled. The communications manager 1220 may be configured as or otherwise support a means for transmitting a second message indicating that the UE is to measure the one or more resources transmitted by the network entity at a first transmit power level of a set of multiple transmit power levels, where the reference resource is associated with one of the set of multiple transmit power levels. The communications manager 1220 may be configured as or otherwise support a means for receiving a first report indicating a first average measurement of the one or more resources associated with the first transmit power level, where the UE measures the one or more resources based on the second message.

By including or configuring the communications manager 1220 in accordance with examples as described herein, the device 1205 may support techniques for CSI reporting when a time restriction parameter is disabled for a UE, which may increase accuracy efficiency of channel measurements by the UE and thus, increase energy savings at a network entity.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of CSI reporting and time restriction as described herein, or the processor 1235 and the memory 1225 may be otherwise configured to perform or support such operations.

Figure 13:
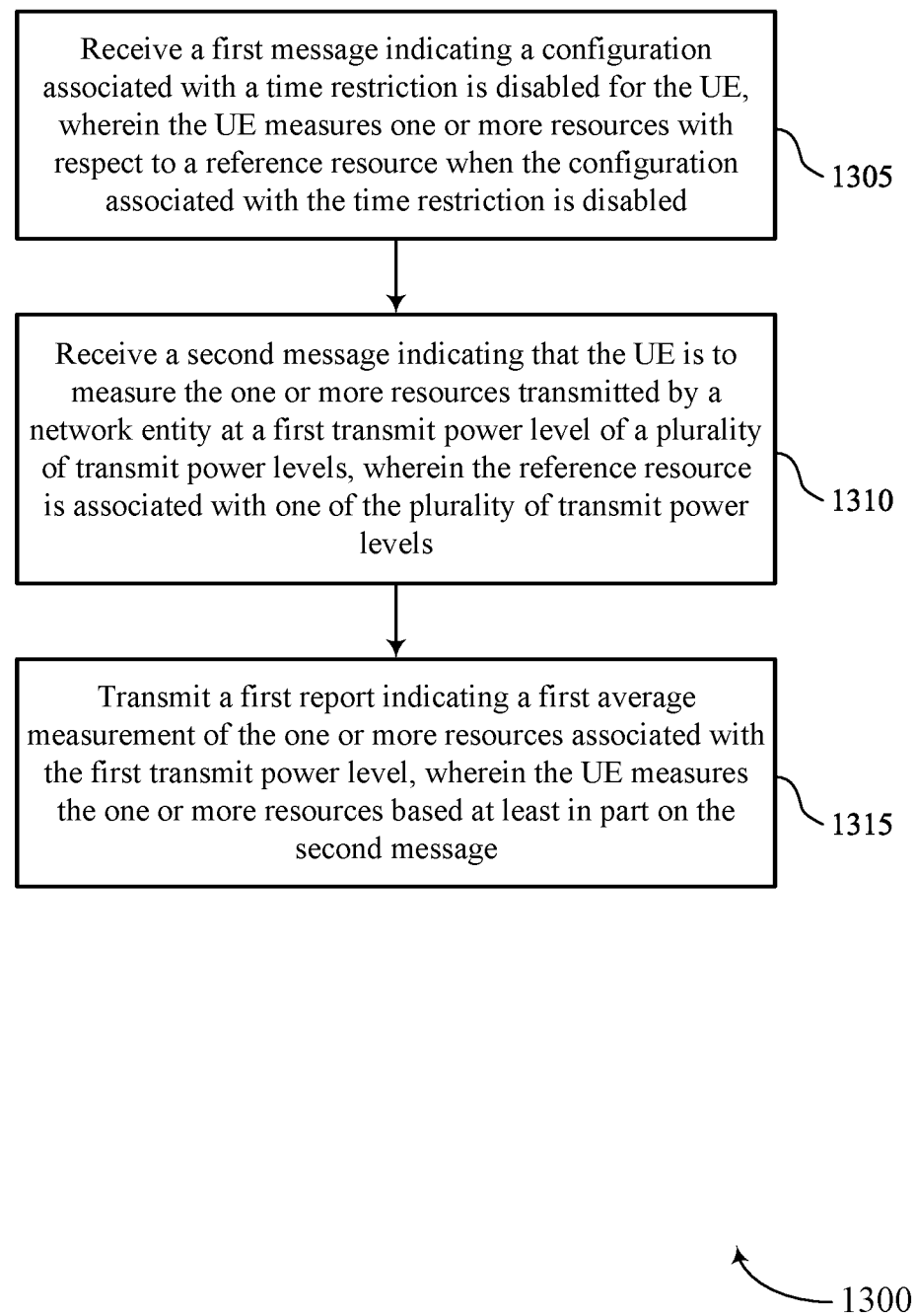
FIGS. 13 through 18 show flowcharts illustrating methods that support CSI reporting and time restriction in accordance with one or more aspects of the present disclosure.

FIG. 13 shows a flowchart illustrating a method 1300 that supports CSI reporting and time restriction in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a first message indicating a configuration associated with a time restriction is disabled for the UE, where the UE measures one or more resources with respect to a reference resource when the configuration associated with the time restriction is disabled. The operations of 1305 may be performed in accordance with examples as disclosed herein. In some examples, aspects of the operations of 1305 may be performed by a time restriction component 725 as described with reference to FIG. 7.

At 1310, the method may include receiving a second message indicating that the UE is to measure the one or more resources transmitted by a network entity at a first transmit power level of a set of multiple transmit power levels, where the reference resource is associated with one of the set of multiple transmit power levels. The operations of 1310 may be performed in accordance with examples as disclosed herein. In some examples, aspects of the operations of 1310 may be performed by a message reception component 730 as described with reference to FIG. 7.

At 1315, the method may include transmitting a first report indicating a first average measurement of the one or more resources associated with the first transmit power level, where the UE measures the one or more resources based on the second message. The operations of 1315 may be performed in accordance with examples as disclosed herein. In some examples, aspects of the operations of 1315 may be performed by a report transmission component 735 as described with reference to FIG. 7.

Figure 14:
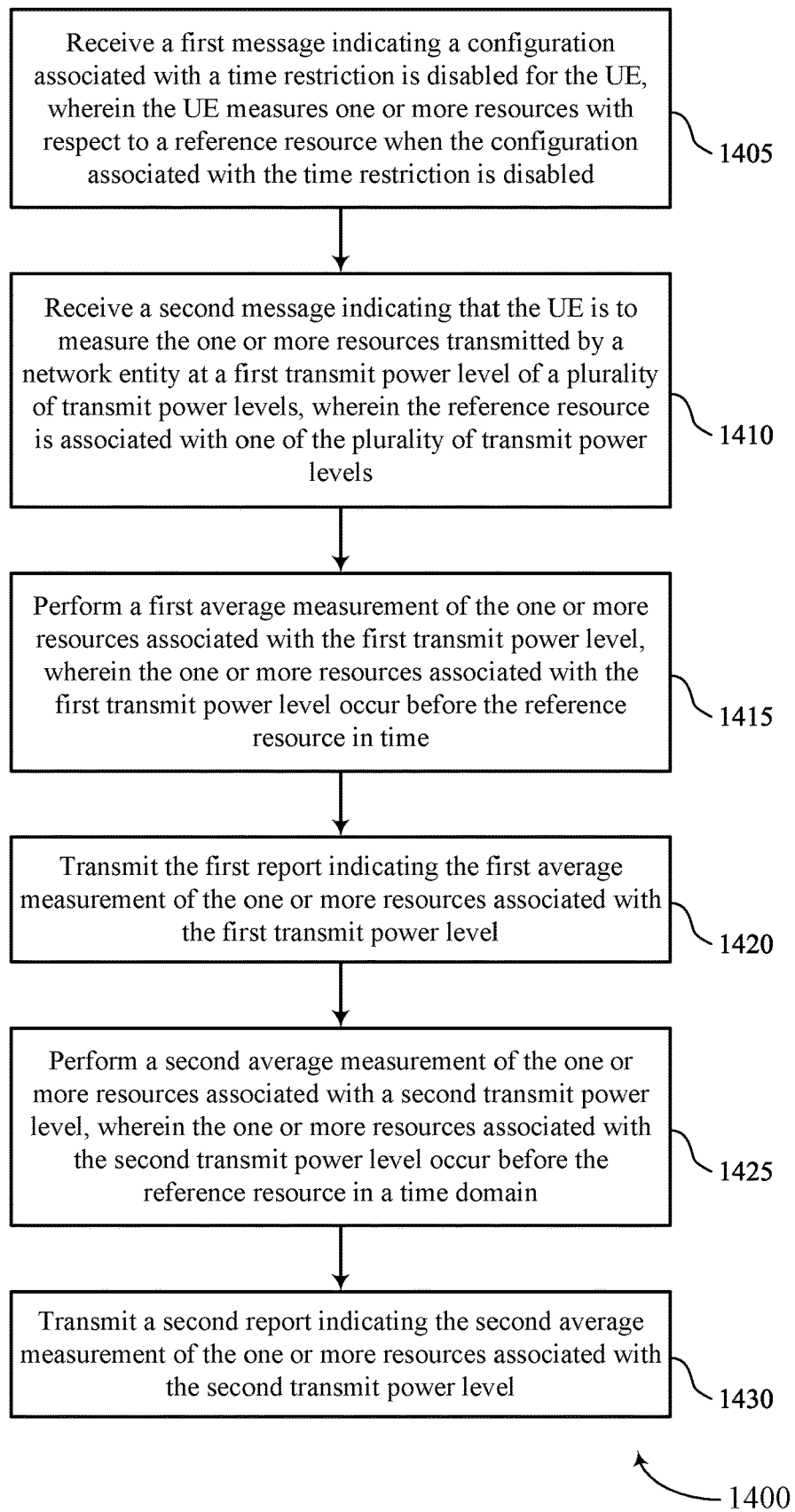

FIG. 14 shows a flowchart illustrating a method 1400 that supports CSI reporting and time restriction in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a first message indicating a configuration associated with a time restriction is disabled for the UE, where the UE measures one or more resources with respect to a reference resource when the configuration associated with the time restriction is disabled. The operations of 1405 may be performed in accordance with examples as disclosed herein. In some examples, aspects of the operations of 1405 may be performed by a time restriction component 725 as described with reference to FIG. 7.

At 1410, the method may include receiving a second message indicating that the UE is to measure the one or more resources transmitted by a network entity at a first transmit power level of a set of multiple transmit power levels, where the reference resource is associated with one of the set of multiple transmit power levels. The operations of 1410 may be performed in accordance with examples as disclosed herein. In some examples, aspects of the operations of 1410 may be performed by a message reception component 730 as described with reference to FIG. 7.

At 1415, the method may include performing a first average measurement of the one or more resources associated with the first transmit power level, where the one or more resources associated with the first transmit power level occur before the reference resource in time. The operations of 1415 may be performed in accordance with examples as disclosed herein. In some examples, aspects of the operations of 1415 may be performed by a measurement component 740 as described with reference to FIG. 7.

At 1420, the method may include transmitting the first report indicating the first average measurement of the one or more resources associated with the first transmit power level. The operations of 1420 may be performed in accordance with examples as disclosed herein. In some examples, aspects of the operations of 1420 may be performed by a report transmission component 735 as described with reference to FIG. 7.

At 1425, the method may include performing a second average measurement of the one or more resources associated with a second transmit power level, where the one or more resources associated with the second transmit power level occur before the reference resource in a time domain. The operations of 1425 may be performed in accordance with examples as disclosed herein. In some examples, aspects of the operations of 1425 may be performed by a measurement component 740 as described with reference to FIG. 7.

At 1430, the method may include transmitting a second report indicating the second average measurement of the one or more resources associated with the second transmit power level. The operations of 1430 may be performed in accordance with examples as disclosed herein. In some examples, aspects of the operations of 1430 may be performed by a report transmission component 735 as described with reference to FIG. 7.

Figure 15:
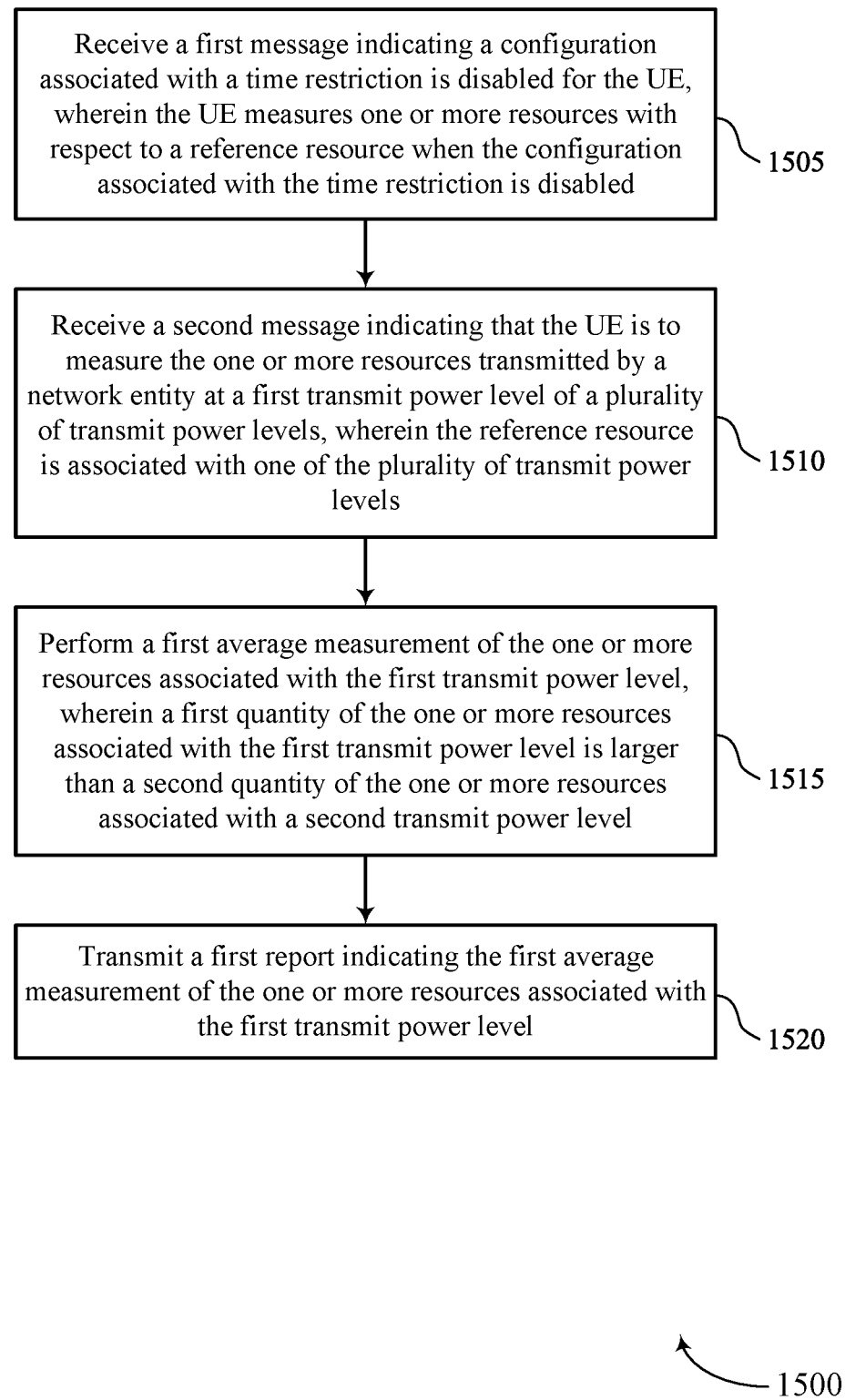

FIG. 15 shows a flowchart illustrating a method 1500 that supports CSI reporting and time restriction in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving a first message indicating a configuration associated with a time restriction is disabled for the UE, where the UE measures one or more resources with respect to a reference resource when the configuration associated with the time restriction is disabled. The operations of 1505 may be performed in accordance with examples as disclosed herein. In some examples, aspects of the operations of 1505 may be performed by a time restriction component 725 as described with reference to FIG. 7.

At 1510, the method may include receiving a second message indicating that the UE is to measure the one or more resources transmitted by a network entity at a first transmit power level of a set of multiple transmit power levels, where the reference resource is associated with one of the set of multiple transmit power levels. The operations of 1510 may be performed in accordance with examples as disclosed herein. In some examples, aspects of the operations of 1510 may be performed by a message reception component 730 as described with reference to FIG. 7.

At 1515, the method may include performing a first average measurement of the one or more resources associated with the first transmit power level, where a first quantity of the one or more resources associated with the first transmit power level is larger than a second quantity of the one or more resources associated with a second transmit power level. The operations of 1515 may be performed in accordance with examples as disclosed herein. In some examples, aspects of the operations of 1515 may be performed by a measurement component 740 as described with reference to FIG. 7.

At 1520, the method may include transmitting the first report indicating the first average measurement of the one or more resources associated with the first transmit power level. The operations of 1520 may be performed in accordance with examples as disclosed herein. In some examples, aspects of the operations of 1520 may be performed by a report transmission component 735 as described with reference to FIG. 7.

Figure 16:
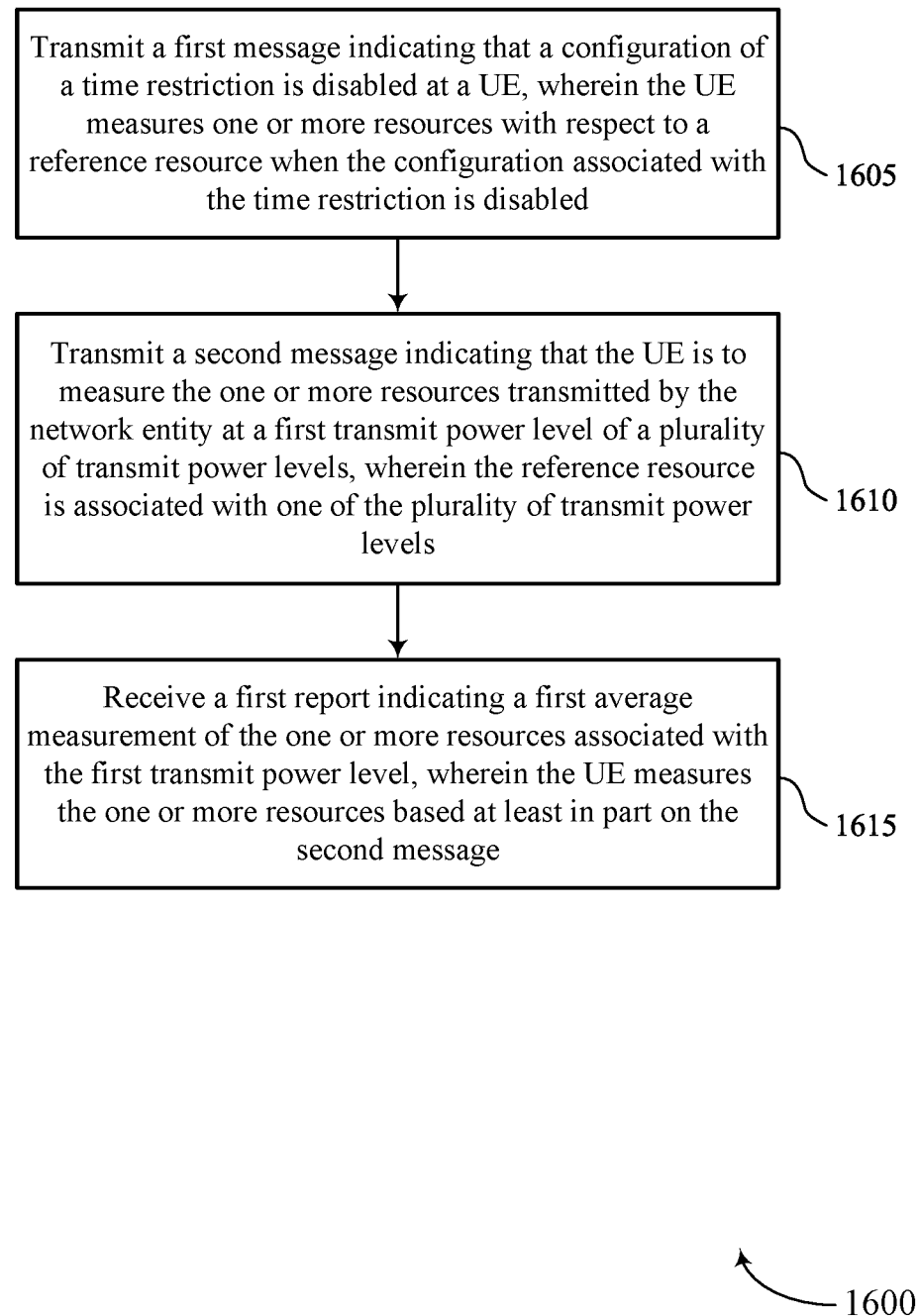

FIG. 16 shows a flowchart illustrating a method 1600 that supports CSI reporting and time restriction in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a first message indicating that a configuration of a time restriction is disabled at a UE, where the UE measures one or more resources with respect to a reference resource when the configuration associated with the time restriction is disabled. The operations of 1605 may be performed in accordance with examples as disclosed herein. In some examples, aspects of the operations of 1605 may be performed by a configuration component 1125 as described with reference to FIG. 11.

At 1610, the method may include transmitting a second message indicating that the UE is to measure the one or more resources transmitted by the network entity at a first transmit power level of a set of multiple transmit power levels, where the reference resource is associated with one of the set of multiple transmit power levels. The operations of 1610 may be performed in accordance with examples as disclosed herein. In some examples, aspects of the operations of 1610 may be performed by a message transmission component 1130 as described with reference to FIG. 11.

At 1615, the method may include receiving a first report indicating a first average measurement of the one or more resources associated with the first transmit power level, where the UE measures the one or more resources based on the second message. The operations of 1615 may be performed in accordance with examples as disclosed herein. In some examples, aspects of the operations of 1615 may be performed by a report reception component 1135 as described with reference to FIG. 11.

Figure 17:
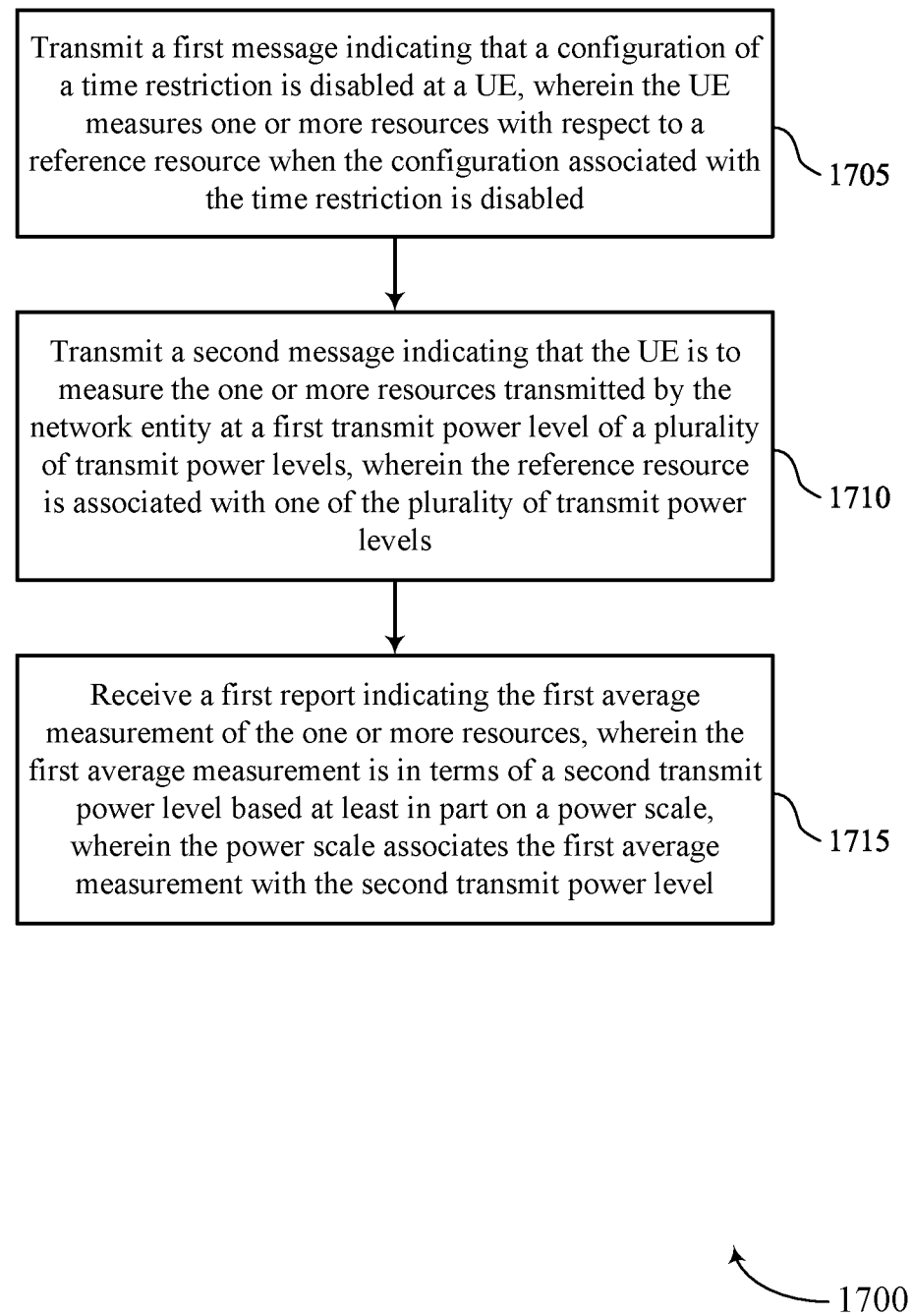

FIG. 17 shows a flowchart illustrating a method 1700 that supports CSI reporting and time restriction in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a first message indicating that a configuration of a time restriction is disabled at a UE, where the UE measures one or more resources with respect to a reference resource when the configuration associated with the time restriction is disabled. The operations of 1705 may be performed in accordance with examples as disclosed herein. In some examples, aspects of the operations of 1705 may be performed by a configuration component 1125 as described with reference to FIG. 11.

At 1710, the method may include transmitting a second message indicating that the UE is to measure the one or more resources transmitted by the network entity at a first transmit power level of a set of multiple transmit power levels, where the reference resource is associated with one of the set of multiple transmit power levels. The operations of 1710 may be performed in accordance with examples as disclosed herein. In some examples, aspects of the operations of 1710 may be performed by a message transmission component 1130 as described with reference to FIG. 11.

At 1715, the method may include receiving a first report indicating the first average measurement of the one or more resources, where the first average measurement is in terms of a second transmit power level based on a power scale, where the power scale associates the first average measurement with the second transmit power level. The operations of 1715 may be performed in accordance with examples as disclosed herein. In some examples, aspects of the operations of 1715 may be performed by a power scale component 1145 as described with reference to FIG. 11.

Figure 18:
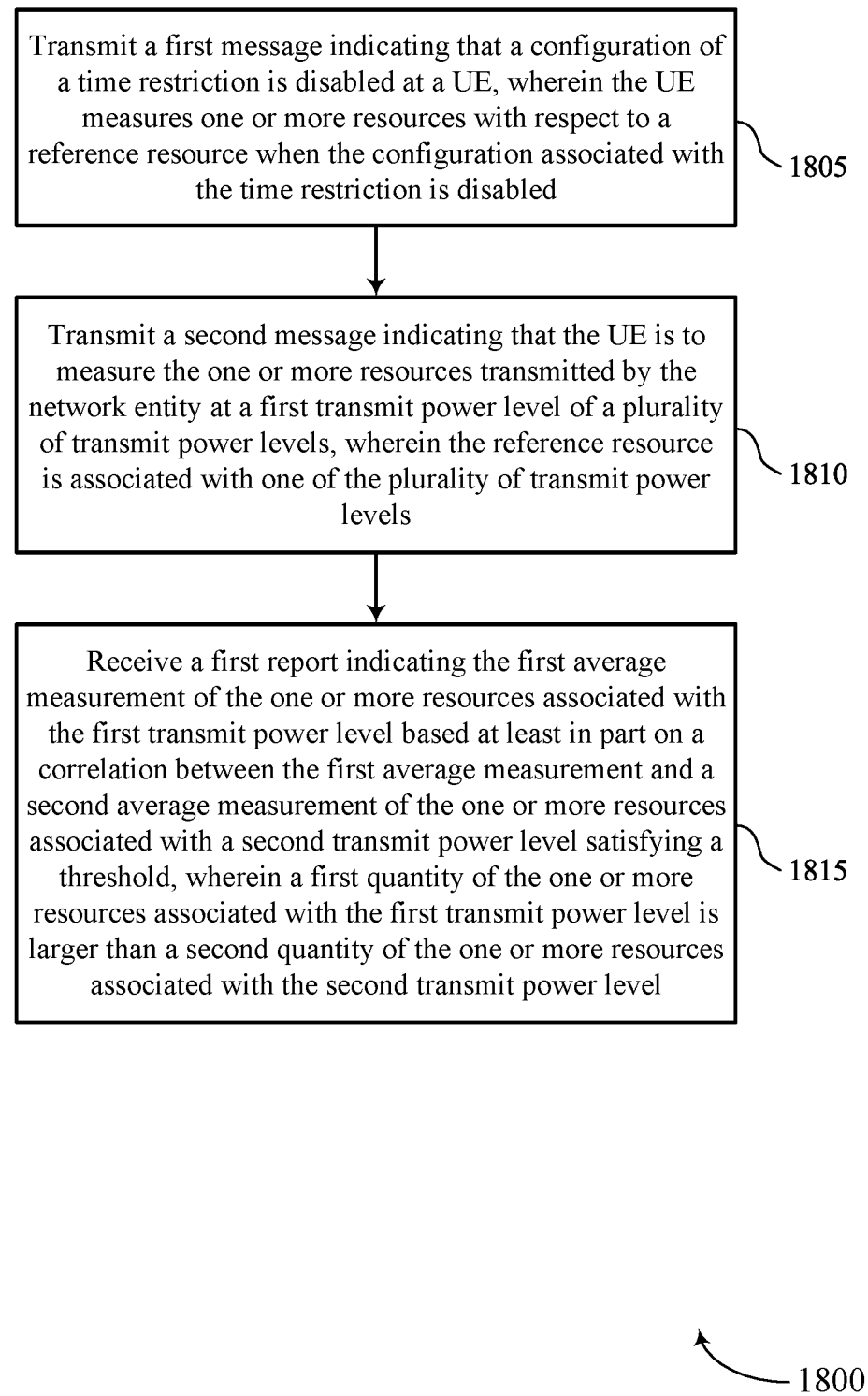

FIG. 18 shows a flowchart illustrating a method 1800 that supports CSI reporting and time restriction in accordance with one or more aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a first message indicating that a configuration of a time restriction is disabled at a UE, where the UE measures one or more resources with respect to a reference resource when the configuration associated with the time restriction is disabled. The operations of 1805 may be performed in accordance with examples as disclosed herein. In some examples, aspects of the operations of 1805 may be performed by a configuration component 1125 as described with reference to FIG. 11.

At 1810, the method may include transmitting a second message indicating that the UE is to measure the one or more resources transmitted by the network entity at a first transmit power level of a set of multiple transmit power levels, where the reference resource is associated with one of the set of multiple transmit power levels. The operations of 1810 may be performed in accordance with examples as disclosed herein. In some examples, aspects of the operations of 1810 may be performed by a message transmission component 1130 as described with reference to FIG. 11.

At 1815, the method may include receiving a first report indicating the first average measurement of the one or more resources associated with the first transmit power level based on a correlation between the first average measurement and a second average measurement of the one or more resources associated with a second transmit power level satisfying a threshold, where a first quantity of the one or more resources associated with the first transmit power level is larger than a second quantity of the one or more resources associated with the second transmit power level. The operations of 1815 may be performed in accordance with examples as disclosed herein. In some examples, aspects of the operations of 1815 may be performed by a measurement correlation component 1150 as described with reference to FIG. 11.

The following provides an overview of aspects of the present disclosure:

Aspect 1: A method for wireless communication at a UE, comprising: receiving a first message indicating a configuration associated with a time restriction is disabled for the UE, wherein the UE measures one or more resources with respect to a reference resource when the configuration associated with the time restriction is disabled; receiving a second message indicating that the UE is to measure the one or more resources transmitted by a network entity at a first transmit power level of a plurality of transmit power levels, wherein the reference resource is associated with one of the plurality of transmit power levels; and transmitting a first report indicating a first average measurement of the one or more resources associated with the first transmit power level, wherein the UE measures the one or more resources based at least in part on the second message.

Aspect 2: The method of aspect 1, further comprising: performing the first average measurement of the one or more resources associated with the first transmit power level, wherein the one or more resources associated with the first transmit power level occur before the reference resource in time; transmitting the first report indicating the first average measurement of the one or more resources associated with the first transmit power level; performing a second average measurement of the one or more resources associated with a second transmit power level, wherein the one or more resources associated with the second transmit power level occur before the reference resource in a time domain; and transmitting a second report indicating the second average measurement of the one or more resources associated with the second transmit power level.

Aspect 3: The method of any of aspects 1 through 2, further comprising: performing the first average measurement of the one or more resources associated with the first transmit power level, wherein a first quantity of the one or more resources associated with the first transmit power level is larger than a second quantity of the one or more resources associated with a second transmit power level; and transmitting the first report indicating the first average measurement of the one or more resources associated with the first transmit power level.

Aspect 4: The method of aspect 3, wherein a third transmit power level that occurs after the second transmit power level in a time domain is equal to the first transmit power level.

Aspect 5: The method of any of aspects 1 through 4, further comprising: performing the first average measurement of the one or more resources associated with the first transmit power level; applying a power scale to the first average measurement based at least in part on performing the first average measurement, wherein the power scale associates the first average measurement with a second transmit power level; and transmitting the first report indicating the first average measurement of the one or more resources, wherein the first average measurement is in terms of the second transmit power level based at least in part on applying the power scale.

Aspect 6: The method of aspect 5, wherein a third transmit power level that occurs after the second transmit power level in a time domain is equal to the second transmit power level.

Aspect 7: The method of any of aspects 1 through 6, further comprising: performing the first average measurement of the one or more resources associated with the first transmit power level and a second average measurement of the one or more resources associated with a second transmit power level, comparing the first average measurement and the second average measurement to identify a correlation between the first average measurement and the second average measurement; and transmitting the first report indicating the first average measurement of the one or more resources associated with the first transmit power level based at least in part on the correlation satisfying a threshold, wherein a first quantity of the one or more resources associated with the first transmit power level is larger than a second quantity of the one or more resources associated with the second transmit power level.

Aspect 8: The method of aspect 7, wherein transmitting the first report comprises: transmitting the first report indicating the second average measurement of the one or more resources associated with the second transmit power level based at least in part on the correlation satisfying the threshold, wherein the first quantity and the second quantity are equal.

Aspect 9: The method of any of aspects 7 through 8, wherein transmitting the first report comprises: transmitting the first report indicating the second average measurement of the one or more resources associated with the second transmit power level based at least in part on the correlation failing to satisfy the threshold, wherein the first quantity is greater than or equal to the second quantity.

Aspect 10: A method for wireless communication at a network entity, comprising: transmitting a first message indicating that a configuration of a time restriction is disabled at a UE, wherein the UE measures one or more resources with respect to a reference resource when the configuration associated with the time restriction is disabled; transmitting a second message indicating that the UE is to measure the one or more resources transmitted by the network entity at a first transmit power level of a plurality of transmit power levels, wherein the reference resource is associated with one of the plurality of transmit power levels; and receiving a first report indicating a first average measurement of the one or more resources associated with the first transmit power level, wherein the UE measures the one or more resources based at least in part on the second message.

Aspect 11: The method of aspect 10, wherein receiving the first report comprises: receiving the first report indicating the first average measurement of the one or more resources associated with the first transmit power level; and receiving a second report indicating a second average measurement of the one or more resources associated with a second transmit power level.

Aspect 12: The method of any of aspects 10 through 11, wherein receiving the first report comprises: receiving the first report indicating the first average measurement of the one or more resources associated with the first transmit power level, wherein a first quantity of the one or more resources associated with the first transmit power level is larger than a second quantity of the one or more resources associated with a second transmit power level.

Aspect 13: The method of aspect 12, wherein a third transmit power level that occurs after the second transmit power level in a time domain is equal to the first transmit power level.

Aspect 14: The method of any of aspects 10 through 13, wherein receiving the first report comprises: receiving the first report indicating the first average measurement of the one or more resources, wherein the first average measurement is in terms of a second transmit power level based at least in part on a power scale, wherein the power scale associates the first average measurement with the second transmit power level.

Aspect 15: The method of aspect 14, further comprising: a third transmit power level that occurs after the second transmit power level in a time domain is equal to the second transmit power level.

Aspect 16: The method of any of aspects 10 through 15, wherein receiving the first report comprises: receiving the first report indicating the first average measurement of the one or more resources associated with the first transmit power level based at least in part on a correlation between the first average measurement and a second average measurement of the one or more resources associated with a second transmit power level satisfying a threshold, wherein a first quantity of the one or more resources associated with the first transmit power level is larger than a second quantity of the one or more resources associated with the second transmit power level.

Aspect 17: The method of aspect 16, wherein receiving the first report comprises: receiving the first report indicating the second average measurement of the one or more resources associated with the second transmit power level based at least in part on the correlation satisfying the threshold, wherein the first quantity and the second quantity are equal.

Aspect 18: The method of any of aspects 16 through 17, wherein receiving the first report comprises: receiving the first report indicating the second average measurement of the one or more resources associated with the second transmit power level based at least in part on the correlation failing to satisfy the threshold, wherein the first quantity is greater than or equal to the second quantity.

Aspect 19: An apparatus for wireless communication at a UE, comprising a processor; memory coupled with the processor; and instructions stored in the memory and executable by the processor to cause the apparatus to perform a method of any of aspects 1 through 9.

Aspect 20: An apparatus for wireless communication at a UE, comprising at least one means for performing a method of any of aspects 1 through 9.

Aspect 21: A non-transitory computer-readable medium storing code for wireless communication at a UE, the code comprising instructions executable by a processor to perform a method of any of aspects 1 through 9.

Aspect 22: An apparatus for wireless communication at a network entity, comprising a processor; memory coupled with the processor; and instructions stored in the memory and executable by the processor to cause the apparatus to perform a method of any of aspects 10 through 18.

Aspect 23: An apparatus for wireless communication at a network entity, comprising at least one means for performing a method of any of aspects 10 through 18.

Aspect 24: A non-transitory computer-readable medium storing code for wireless communication at a network entity, the code comprising instructions executable by a processor to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    a processor;
    memory coupled with the processor; and
    instructions stored in the memory and executable by the processor to cause the apparatus to:
        receive a first message indicating a configuration associated with a time restriction is disabled for the UE, wherein the UE measures one or more resources with respect to a reference resource when the configuration associated with the time restriction is disabled;
        receive a second message indicating that the UE is to measure the one or more resources transmitted by a network entity at a first transmit power level of a plurality of transmit power levels, wherein the reference resource is associated with one of the plurality of transmit power levels; and
        transmit a first report indicating a first average measurement of the one or more resources associated with the first transmit power level, wherein the UE measures the one or more resources based at least in part on the second message.

2. The apparatus of claim 1, wherein the instructions are further executable by the processor to cause the apparatus to:
    perform the first average measurement of the one or more resources associated with the first transmit power level, wherein the one or more resources associated with the first transmit power level occur before the reference resource in time;
    transmit the first report indicating the first average measurement of the one or more resources associated with the first transmit power level;
    perform a second average measurement of the one or more resources associated with a second transmit power level, wherein the one or more resources associated with the second transmit power level occur before the reference resource in a time domain; and
    transmit a second report indicating the second average measurement of the one or more resources associated with the second transmit power level.

3. The apparatus of claim 1, wherein the instructions are further executable by the processor to cause the apparatus to:
    perform the first average measurement of the one or more resources associated with the first transmit power level, wherein a first quantity of the one or more resources associated with the first transmit power level is larger than a second quantity of the one or more resources associated with a second transmit power level; and
    transmit the first report indicating the first average measurement of the one or more resources associated with the first transmit power level.

4. The apparatus of claim 3, wherein a third transmit power level that occurs after the second transmit power level in a time domain is equal to the first transmit power level.

5. The apparatus of claim 1, wherein the instructions are further executable by the processor to cause the apparatus to:
    perform the first average measurement of the one or more resources associated with the first transmit power level;
    apply a power scale to the first average measurement based at least in part on performing the first average measurement, wherein the power scale associates the first average measurement with a second transmit power level; and
    transmit the first report indicating the first average measurement of the one or more resources, wherein the first average measurement is in terms of the second transmit power level based at least in part on applying the power scale.

6. The apparatus of claim 5, wherein a third transmit power level that occurs after the second transmit power level in a time domain is equal to the second transmit power level.

7. The apparatus of claim 1, wherein the instructions are further executable by the processor to cause the apparatus to:
    perform the first average measurement of the one or more resources associated with the first transmit power level and a second average measurement of the one or more resources associated with a second transmit power level,
    compare the first average measurement and the second average measurement to identify a correlation between the first average measurement and the second average measurement; and
    transmit the first report indicating the first average measurement of the one or more resources associated with the first transmit power level based at least in part on the correlation satisfying a threshold, wherein a first quantity of the one or more resources associated with the first transmit power level is larger than a second quantity of the one or more resources associated with the second transmit power level.

8. The apparatus of claim 7, wherein the instructions to transmit the first report are executable by the processor to cause the apparatus to:

transmit the first report indicating the second average measurement of the one or more resources associated with the second transmit power level based at least in part on the correlation satisfying the threshold, wherein the first quantity and the second quantity are equal.

9. The apparatus of claim 7, wherein the instructions to transmit the first report are executable by the processor to cause the apparatus to:
transmit the first report indicating the second average measurement of the one or more resources associated with the second transmit power level based at least in part on the correlation failing to satisfy the threshold, wherein the first quantity is greater than or equal to the second quantity.

10. An apparatus for wireless communication at a network entity, comprising:
a processor;
memory coupled with the processor; and
instructions stored in the memory and executable by the processor to cause the apparatus to:
transmit a first message indicating that a configuration of a time restriction is disabled at a user equipment (UE), wherein the UE measures one or more resources with respect to a reference resource when the configuration associated with the time restriction is disabled;
transmit a second message indicating that the UE is to measure the one or more resources transmitted by the network entity at a first transmit power level of a plurality of transmit power levels, wherein the reference resource is associated with one of the plurality of transmit power levels; and
receive a first report indicating a first average measurement of the one or more resources associated with the first transmit power level, wherein the UE measures the one or more resources based at least in part on the second message.

11. The apparatus of claim 10, wherein the instructions to receive the first report are executable by the processor to cause the apparatus to:
receive the first report indicating the first average measurement of the one or more resources associated with the first transmit power level; and
receive a second report indicating a second average measurement of the one or more resources associated with a second transmit power level.

12. The apparatus of claim 10, wherein the instructions to receive the first report are executable by the processor to cause the apparatus to:
receive the first report indicating the first average measurement of the one or more resources associated with the first transmit power level, wherein a first quantity of the one or more resources associated with the first transmit power level is larger than a second quantity of the one or more resources associated with a second transmit power level.

13. The apparatus of claim 12, wherein a third transmit power level that occurs after the second transmit power level in a time domain is equal to the first transmit power level.

14. The apparatus of claim 10, wherein the instructions to receive the first report are executable by the processor to cause the apparatus to:
receive the first report indicating the first average measurement of the one or more resources, wherein the first average measurement is in terms of a second transmit power level based at least in part on a power scale, wherein the power scale associates the first average measurement with the second transmit power level.

15. The apparatus of claim 14, wherein the instructions are further executable by the processor to cause the apparatus to:
a third transmit power level that occur after the second transmit power level in a time domain is equal to the second transmit power level.

16. The apparatus of claim 10, wherein the instructions to receive the first report are executable by the processor to cause the apparatus to:
receive the first report indicating the first average measurement of the one or more resources associated with the first transmit power level based at least in part on a correlation between the first average measurement and a second average measurement of the one or more resources associated with a second transmit power level satisfying a threshold, wherein a first quantity of the one or more resources associated with the first transmit power level is larger than a second quantity of the one or more resources associated with the second transmit power level.

17. The apparatus of claim 16, wherein the instructions to receive the first report are executable by the processor to cause the apparatus to:
receive the first report indicating the second average measurement of the one or more resources associated with the second transmit power level based at least in part on the correlation satisfying the threshold, wherein the first quantity and the second quantity are equal.

18. The apparatus of claim 16, wherein the instructions to receive the first report are executable by the processor to cause the apparatus to:
receive the first report indicating the second average measurement of the one or more resources associated with the second transmit power level based at least in part on the correlation failing to satisfy the threshold, wherein the first quantity is greater than or equal to the second quantity.

19. A method for wireless communication at a user equipment (UE), comprising:
receiving a first message indicating a configuration associated with a time restriction is disabled for the UE, wherein the UE measures one or more resources with respect to a reference resource when the configuration associated with the time restriction is disabled;
receiving a second message indicating that the UE is to measure the one or more resources transmitted by a network entity at a first transmit power level of a plurality of transmit power levels, wherein the reference resource is associated with one of the plurality of transmit power levels; and
transmitting a first report indicating a first average measurement of the one or more resources associated with the first transmit power level, wherein the UE measures the one or more resources based at least in part on the second message.

20. The method of claim 19, further comprising:
performing the first average measurement of the one or more resources associated with the first transmit power level, wherein the one or more resources associated with the first transmit power level occur before the reference resource in time;
transmitting the first report indicating the first average measurement of the one or more resources associated with the first transmit power level;

performing a second average measurement of the one or more resources associated with a second transmit power level, wherein the one or more resources associated with the second transmit power level occur before the reference resource in a time domain; and transmitting a second report indicating the second average measurement of the one or more resources associated with the second transmit power level.

21. The method of claim 19, further comprising:
performing the first average measurement of the one or more resources associated with the first transmit power level, wherein a first quantity of the one or more resources associated with the first transmit power level is larger than a second quantity of the one or more resources associated with a second transmit power level; and
transmitting the first report indicating the first average measurement of the one or more resources associated with the first transmit power level.

22. The method of claim 21, wherein a third transmit power level that occurs after the second transmit power level in a time domain is equal to the first transmit power level.

23. The method of claim 19, further comprising:
performing the first average measurement of the one or more resources associated with the first transmit power level;
applying a power scale to the first average measurement based at least in part on performing the first average measurement, wherein the power scale associates the first average measurement with a second transmit power level; and
transmitting the first report indicating the first average measurement of the one or more resources, wherein the first average measurement is in terms of the second transmit power level based at least in part on applying the power scale.

24. The method of claim 23, wherein a third transmit power level that occurs after the second transmit power level in a time domain is equal to the second transmit power level.

25. A method for wireless communication at a network entity, comprising:
transmitting a first message indicating that a configuration of a time restriction is disabled at a user equipment (UE), wherein the UE measures one or more resources with respect to a reference resource when the configuration associated with the time restriction is disabled;
transmitting a second message indicating that the UE is to measure the one or more resources transmitted by the network entity at a first transmit power level of a plurality of transmit power levels, wherein the reference resource is associated with one of the plurality of transmit power levels; and
receiving a first report indicating a first average measurement of the one or more resources associated with the first transmit power level, wherein the UE measures the one or more resources based at least in part on the second message.

26. The method of claim 25, wherein receiving the first report comprises:
receiving the first report indicating the first average measurement of the one or more resources associated with the first transmit power level; and
receiving a second report indicating a second average measurement of the one or more resources associated with a second transmit power level.

27. The method of claim 25, wherein receiving the first report comprises:
receiving the first report indicating the first average measurement of the one or more resources associated with the first transmit power level, wherein a first quantity of the one or more resources associated with the first transmit power level is larger than a second quantity of the one or more resources associated with a second transmit power level.

28. The method of claim 27, wherein a third transmit power level that occurs after the second transmit power level in a time domain is equal to the first transmit power level.

29. The method of claim 25, wherein receiving the first report comprises:
receiving the first report indicating the first average measurement of the one or more resources, wherein the first average measurement is in terms of a second transmit power level based at least in part on a power scale, wherein the power scale associates the first average measurement with the second transmit power level.

30. The method of claim 29, further comprising:
a third transmit power level that occurs after the second transmit power level in a time domain is equal to the second transmit power level.

* * * * *